(12) United States Patent
Crowley et al.

(10) Patent No.: US 8,528,914 B2
(45) Date of Patent: Sep. 10, 2013

(54) QUICK-RELEASE JAWS WITH SINGLE-PIECE BEARING CHUCK

(75) Inventors: Brian J. Crowley, Elk Rapids, MI (US); Charlie S. Carmoney, Interlochen, MI (US); Thomas H. Dejonghe, Sterling Heights, MI (US); Thomas M. Grobbel, Ortonville, MI (US); William R. Stickney, Honor, MI (US); Thomas Allen Borysiak, Traverse City, MI (US)

(73) Assignee: Forkardt Inc., Elmira, NY (US)

( * ) Notice: Subject to any disclaimer, the term of this patent is extended or adjusted under 35 U.S.C. 154(b) by 1051 days.

(21) Appl. No.: 12/434,762

(22) Filed: May 4, 2009

(65) Prior Publication Data
US 2009/0206560 A1 Aug. 20, 2009

Related U.S. Application Data

(63) Continuation-in-part of application No. 11/711,910, filed on Feb. 27, 2007, now Pat. No. 7,594,665.

(51) Int. Cl.
*B23B 31/18* (2006.01)
*B23B 31/39* (2006.01)
*B23B 31/175* (2006.01)

(52) U.S. Cl.
USPC ........... 279/109; 279/118; 279/124; 279/132; 279/901

(58) Field of Classification Search
USPC ................. 279/106–109, 118–121, 123, 124, 279/132, 133, 901
IPC ............................... B23B 31/18, 31/39, 31/175
See application file for complete search history.

(56) References Cited

U.S. PATENT DOCUMENTS

| | | | |
|---|---|---|---|
| 185,838 A | 1/1877 | Saunders | |
| RE8,793 E | 7/1879 | Pratt | |
| 2,576,350 A | 11/1951 | Mazzola | |
| 3,069,181 A | 12/1962 | Hohwart et al. | |
| 3,082,015 A | 3/1963 | Hohwart et al. | |
| 3,093,366 A | 6/1963 | Ernest | |
| 3,099,457 A | 7/1963 | Hohwart et al. | |
| 3,104,886 A | 9/1963 | Hohwart et al. | |
| 3,219,356 A * | 11/1965 | Wilterdink et al. | 279/123 |
| 3,365,206 A | 1/1968 | Hohwart et al. | |
| 3,380,747 A | 4/1968 | Hohwart et al. | |
| 3,423,098 A | 1/1969 | Toth et al. | |
| 3,472,526 A | 10/1969 | Hohwart | |
| 3,656,773 A * | 4/1972 | Blattry et al. | 279/121 |
| 3,682,491 A * | 8/1972 | Sakazaki et al. | 279/124 |

(Continued)

FOREIGN PATENT DOCUMENTS

| | | |
|---|---|---|
| DE | 3322201 | 1/1985 |
| DE | 3425603 A1 * | 2/1986 |

(Continued)

OTHER PUBLICATIONS

U.S. Appl. No. 12/545,775, filed Aug. 21, 2009; Crowley et al.

*Primary Examiner* — Eric A Gates
(74) *Attorney, Agent, or Firm* — Pillsbury Winthrop Shaw Pittman LLP

(57) ABSTRACT

A system, in certain embodiments, includes a cutting tool, a drive and a chuck rotatable by the drive. The chuck includes multiple actuator arms, multiple jaws and multiple spring-loaded lock pins coupling the respective jaws to the respective actuator arms.

19 Claims, 21 Drawing Sheets

(56) References Cited

U.S. PATENT DOCUMENTS

| | | | | |
|---|---|---|---|---|
| 3,704,022 A | * | 11/1972 | Blattry et al. | 279/121 |
| 3,810,703 A | | 5/1974 | Pasbrig | |
| 4,097,053 A | | 6/1978 | Steinberger | |
| 4,136,588 A | | 1/1979 | Roder | |
| 4,200,300 A | * | 4/1980 | Rohm | 279/124 |
| 4,240,645 A | | 12/1980 | Rohm | |
| 4,243,237 A | | 1/1981 | Rohm | |
| 4,362,306 A | * | 12/1982 | Rohm | 279/121 |
| 4,465,289 A | | 8/1984 | Banks | |
| 4,507,031 A | | 3/1985 | Hiestand | |
| 4,639,001 A | * | 1/1987 | Berardo | 279/121 |
| 4,667,971 A | * | 5/1987 | Norton et al. | 279/121 |
| 4,690,416 A | | 9/1987 | Röhm | |
| 4,725,065 A | * | 2/1988 | Hiestand | 279/123 |
| 4,763,906 A | | 8/1988 | Barbieux | |
| 4,969,654 A | * | 11/1990 | Theodolin | 279/119 |
| 5,015,003 A | | 5/1991 | Ramunas | |
| 5,052,700 A | | 10/1991 | Howard et al. | |
| 5,060,957 A | | 10/1991 | Stolzenberg et al. | |
| 5,076,596 A | | 12/1991 | Jaggers | |
| 5,129,662 A | * | 7/1992 | Kempken | 279/123 |
| 5,135,242 A | | 8/1992 | Toth | |
| 5,158,307 A | * | 10/1992 | Toyano et al. | 279/121 |
| 5,174,589 A | | 12/1992 | Gulde | |
| 5,184,833 A | | 2/1993 | Cross et al. | |
| 5,322,305 A | | 6/1994 | Cross et al. | |
| 5,330,205 A | | 7/1994 | Norton | |
| 5,409,242 A | | 4/1995 | Gonnocci | |
| 5,524,910 A | | 6/1996 | Chase et al. | |
| 5,630,594 A | * | 5/1997 | Bronzino et al. | 279/123 |
| 5,716,058 A | * | 2/1998 | Bronzino et al. | 279/121 |
| 5,845,912 A | | 12/1998 | Grupa | |
| 6,145,850 A | | 11/2000 | Rehm | |
| 6,241,261 B1 | | 6/2001 | Rehm | |
| 6,264,210 B1 | | 7/2001 | Difasi et al. | |
| 6,354,606 B1 | | 3/2002 | Finn, III | |
| 6,371,493 B1 | | 4/2002 | Barbieux | |
| 6,375,197 B1 | | 4/2002 | Barbieux | |
| 6,454,278 B1 | | 9/2002 | Wrobel et al. | |
| 6,474,658 B2 | | 11/2002 | Hanai | |
| 6,491,305 B2 | | 12/2002 | Sida | |
| 6,655,699 B2 | | 12/2003 | Grobbel | |
| 6,837,499 B2 | | 1/2005 | Rohm | |
| 7,516,964 B2 | * | 4/2009 | Ubele et al. | 279/124 |
| 7,594,665 B2 | | 9/2009 | Crowley et al. | |
| 7,862,051 B2 | | 1/2011 | Rehm et al. | |
| 8,221,296 B2 | * | 7/2012 | Hildebrandt et al. | 483/20 |
| 8,272,646 B2 | | 9/2012 | Fink | |
| 2001/0011800 A1 | | 8/2001 | Hanai | |
| 2003/0160400 A1 | | 8/2003 | Rohm et al. | |
| 2009/0206560 A1 | | 8/2009 | Crowley et al. | |
| 2010/0038867 A1 | | 2/2010 | Dejonghe et al. | |

FOREIGN PATENT DOCUMENTS

| | | | |
|---|---|---|---|
| DE | 3512929 | | 10/1986 |
| DE | 3603459 A1 | * | 8/1987 |
| DE | 29810720 | | 12/1998 |
| EP | 47096 A2 | * | 3/1982 |
| EP | 0111787 | | 6/1984 |
| EP | 251266 | | 1/1988 |
| EP | 1022080 | | 7/2000 |
| FR | 2373351 A | * | 8/1978 |
| JP | S56163808 | | 12/1981 |
| JP | 61244401 A | * | 10/1986 |
| JP | H01172625 | | 7/1989 |
| JP | H01321104 | | 12/1989 |
| JP | 03019704 A | * | 1/1991 |
| JP | 08229712 | | 9/1996 |
| JP | 8229712 | | 9/1996 |
| JP | 11070402 | | 3/1999 |
| JP | 11165205 | | 6/1999 |
| JP | 2001219309 | | 8/2001 |
| JP | 2006102858 | | 4/2006 |
| WO | WO03047812 | | 6/2003 |
| WO | WO2008049621 | | 5/2008 |

* cited by examiner

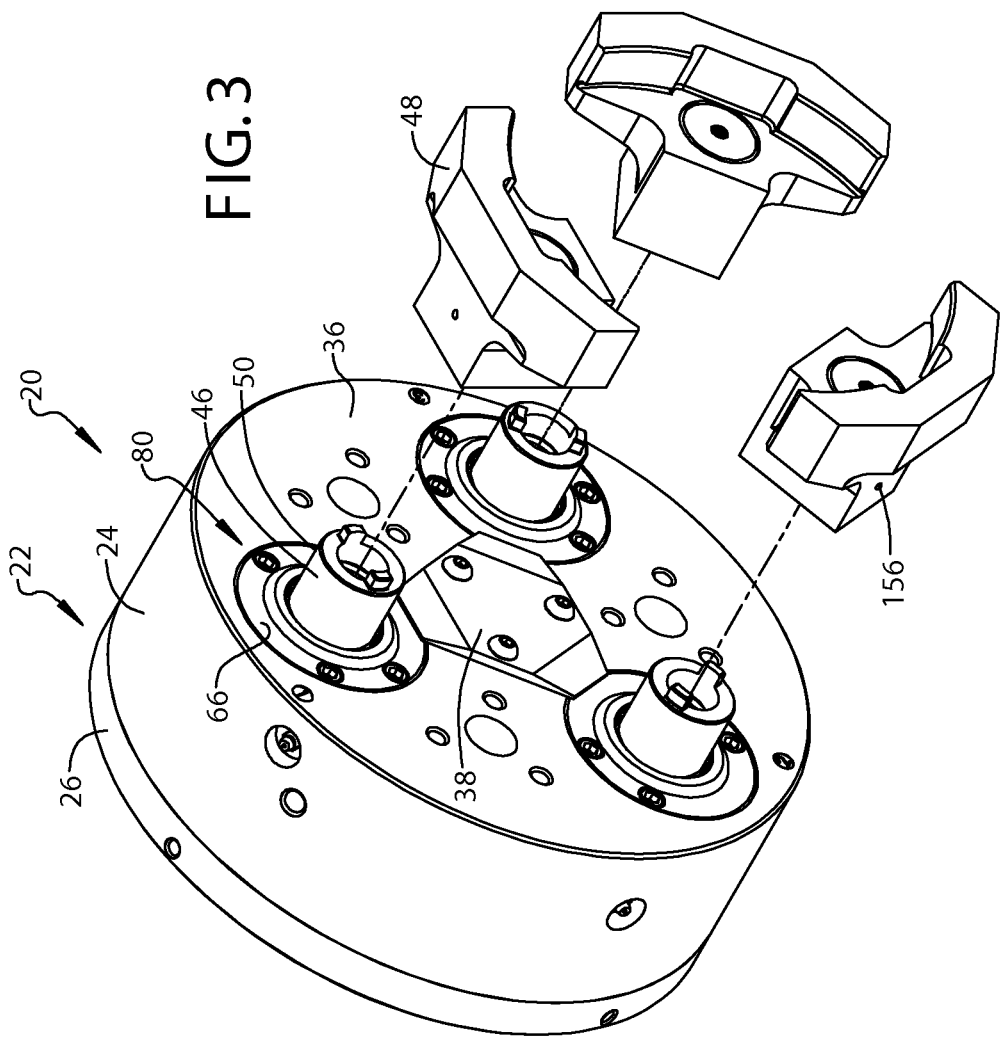

QUICK-RELEASE JAWS WITH SINGLE-PIECE BEARING CHUCK

CROSS REFERENCE TO RELATED APPLICATIONS

This application is a continuation-in-part of U.S. patent application Ser. No. 11/711,910, entitled "Quick-Release Jaws with Single-Piece Bearing Chuck", filed Feb. 27, 2007, which is herein incorporated by reference.

BACKGROUND

The invention relates generally to quick-release jaws with a single-piece bearing chuck.

An adjustable chuck of the type in widespread use for gripping workpieces of different sizes typically includes a plurality of jaws that are radially movable to grip and release a workpiece. The jaws are typically configured for retaining a specific workpiece. Thus, the jaws are changed to grip different workpieces. Unfortunately, the process of changing the jaws is time consuming. Therefore, reducing jaw reconfiguration time may improve operational efficiency of the machining apparatus to which the chuck is attached.

BRIEF DESCRIPTION

A system, in certain embodiments, includes a cutting tool, a drive and a chuck rotatable by the drive. The chuck includes multiple actuator arms, multiple jaws and multiple spring-loaded lock pins coupling the respective jaws to the respective actuator arms.

DRAWINGS

These and other features, aspects, and advantages of the present invention will become better understood when the following detailed description is read with reference to the accompanying drawings in which like characters represent like parts throughout the drawings, wherein:

FIG. 3 is another perspective view of an embodiment of the chuck of FIG. 1B showing the jaws uncoupled from the actuator arms;

Figure 2:
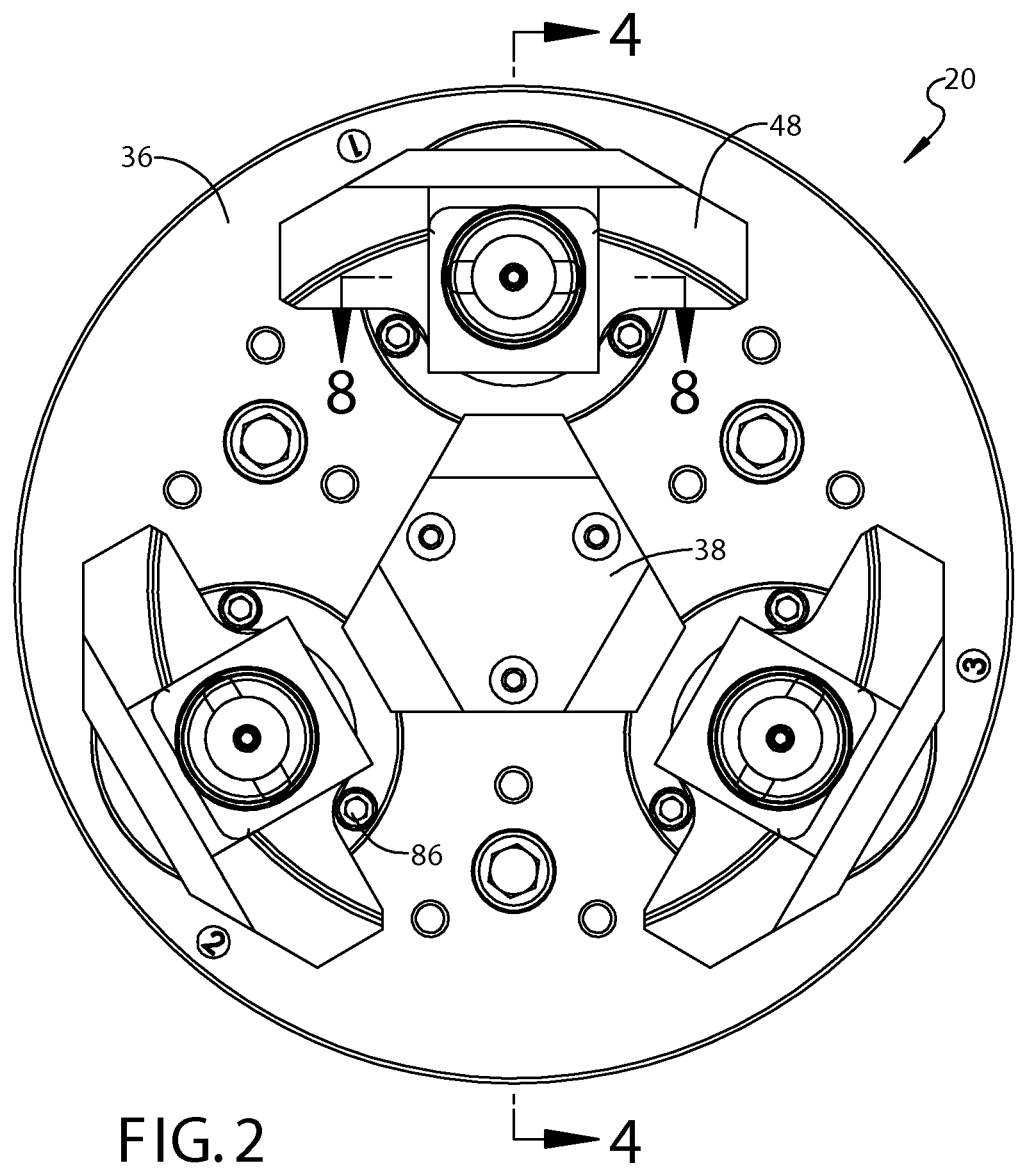
FIG. 2 is a top plan view of an embodiment of the chuck of FIG. 1B.
Figure 4A:
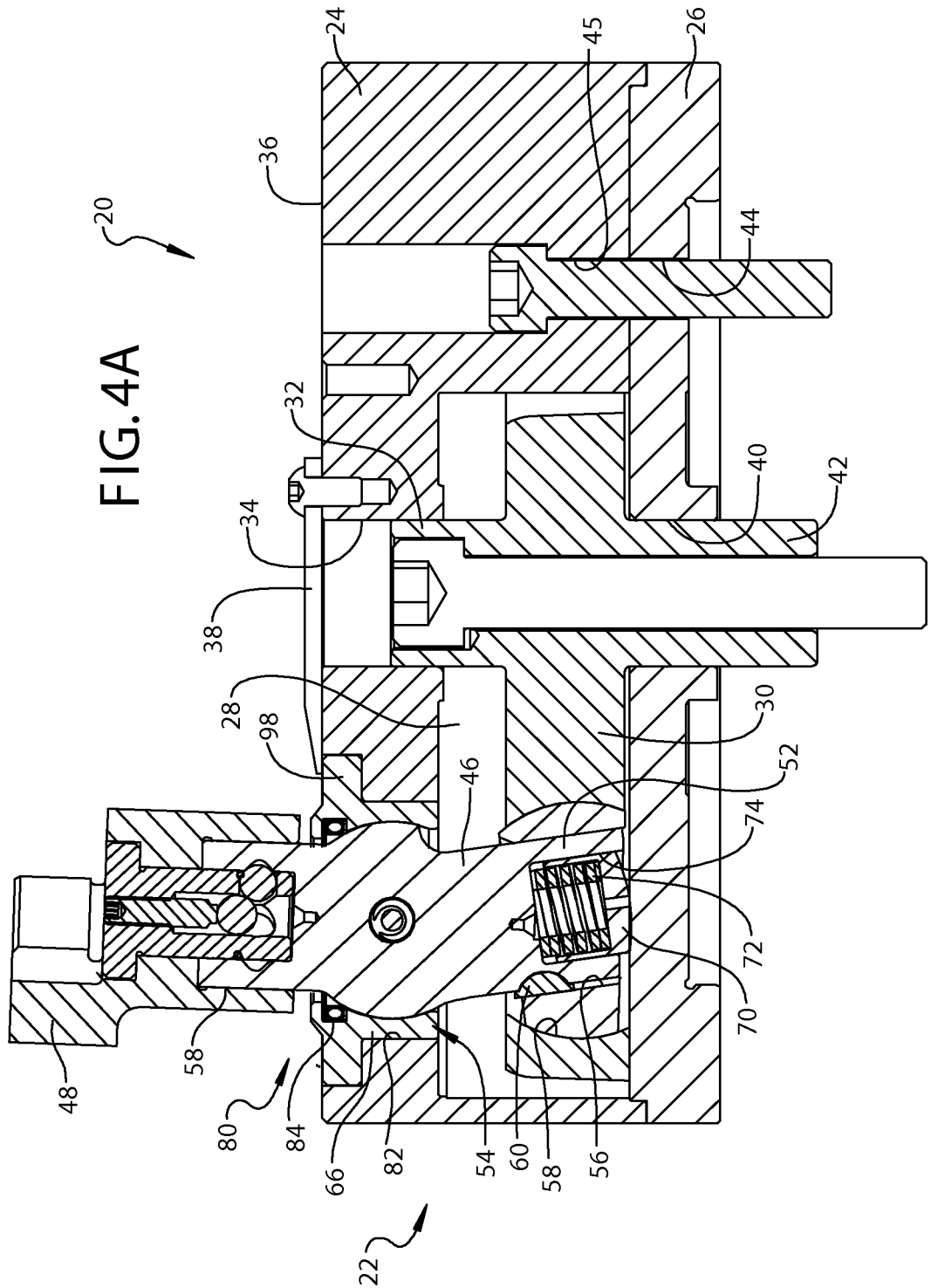
Figure 5:
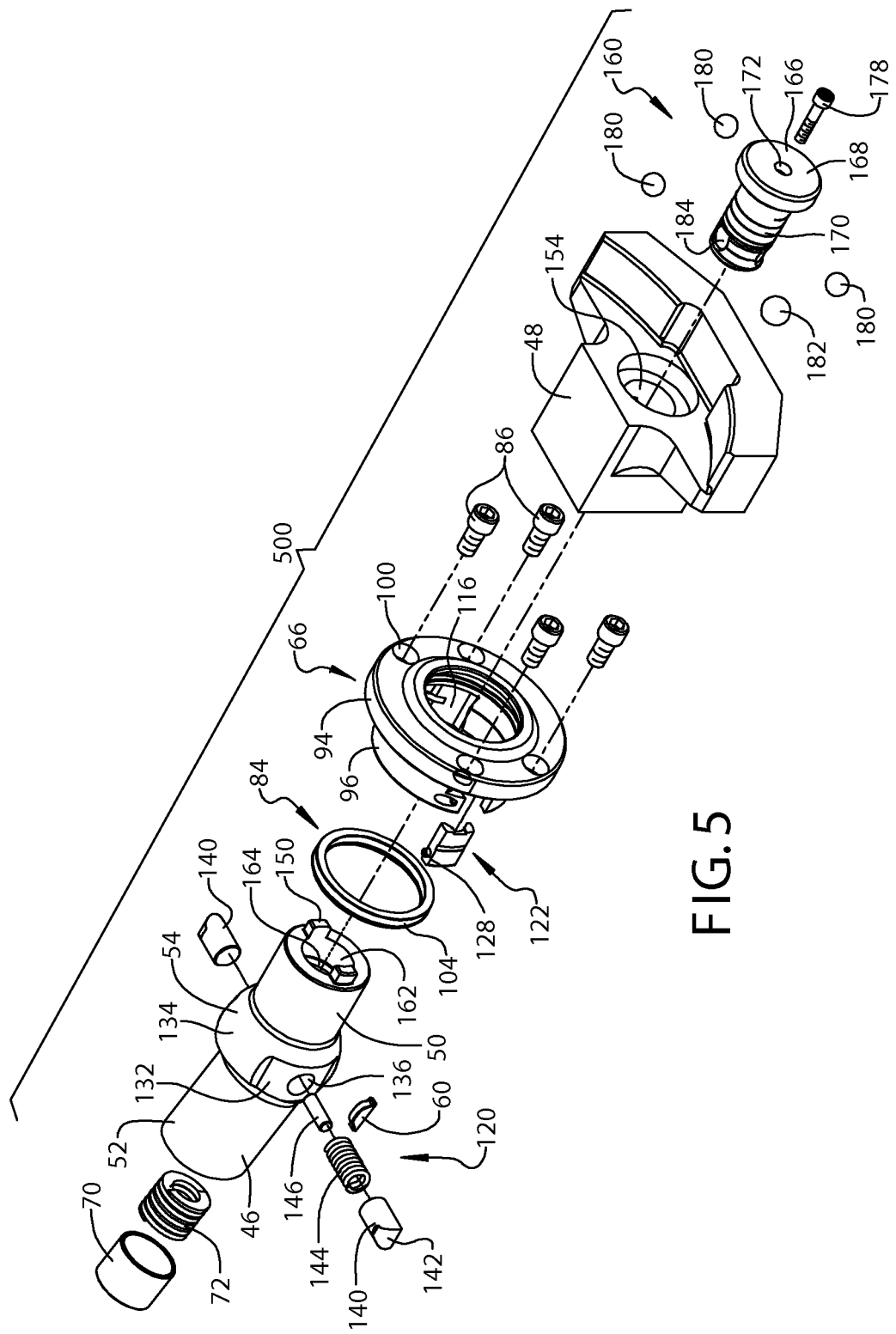
Figure 6:
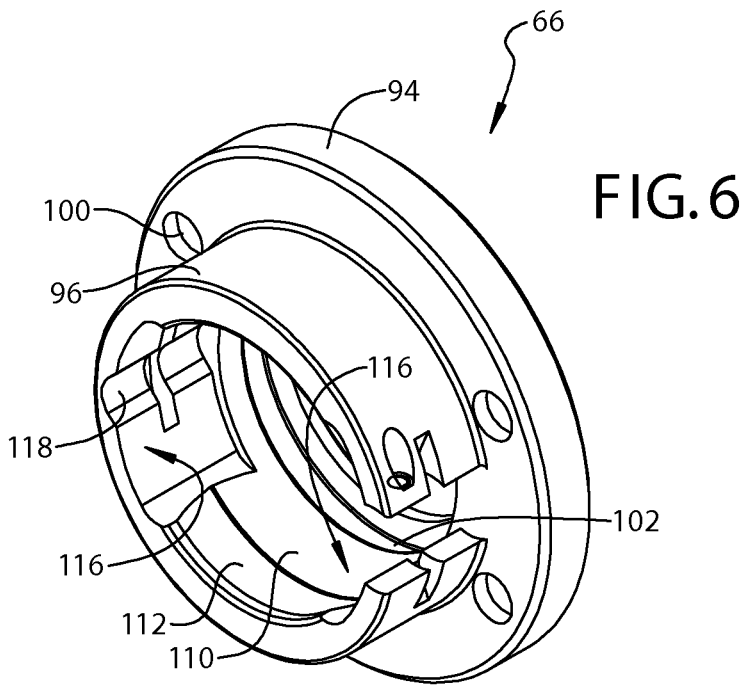
Figure 7:
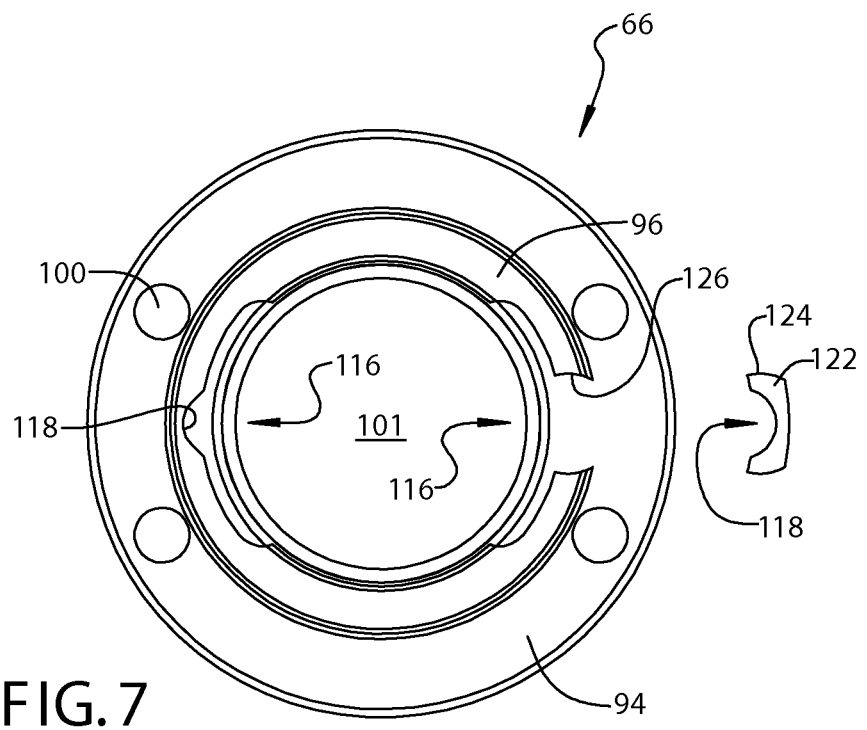
Figure 8A:
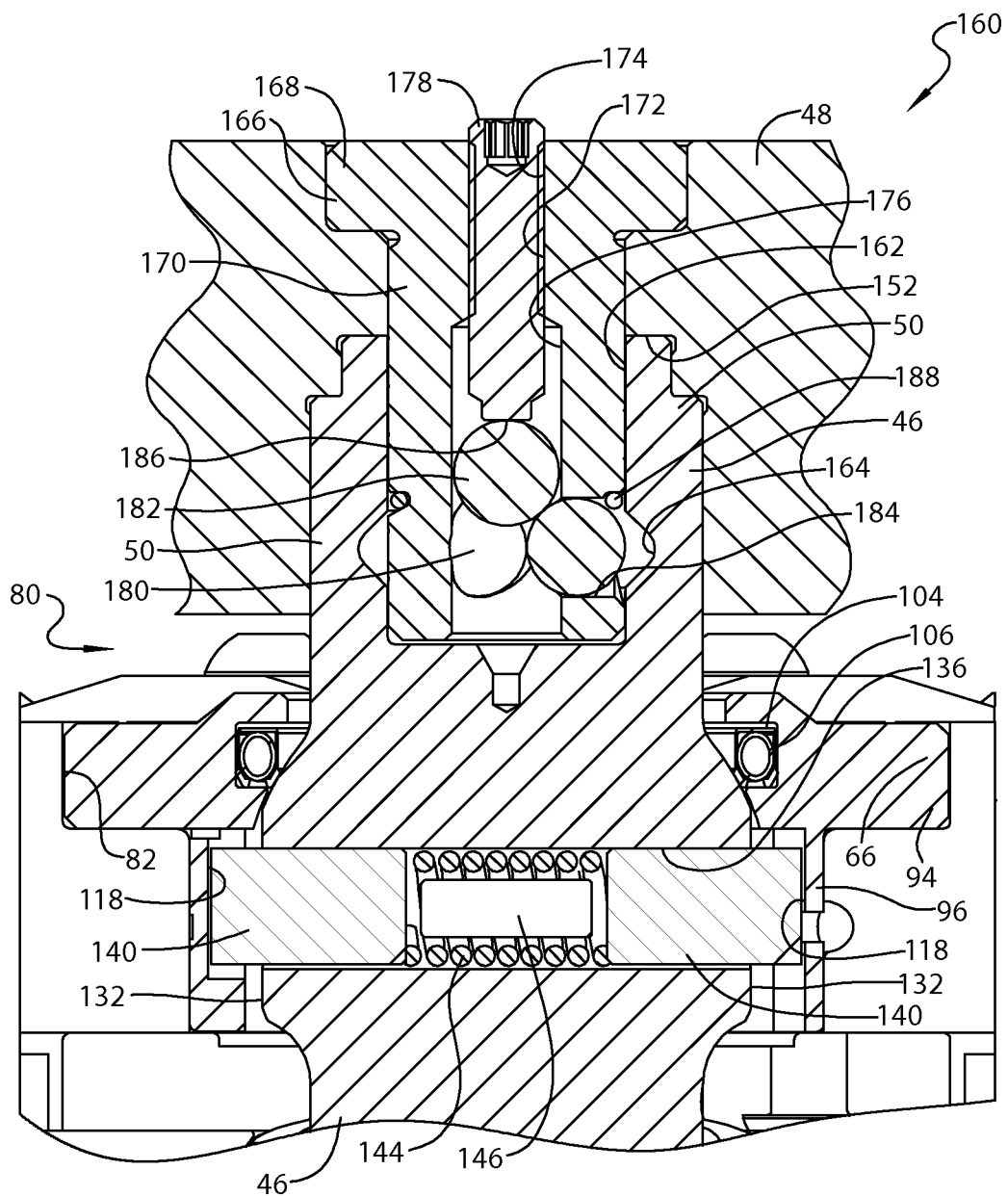
Figure 9:
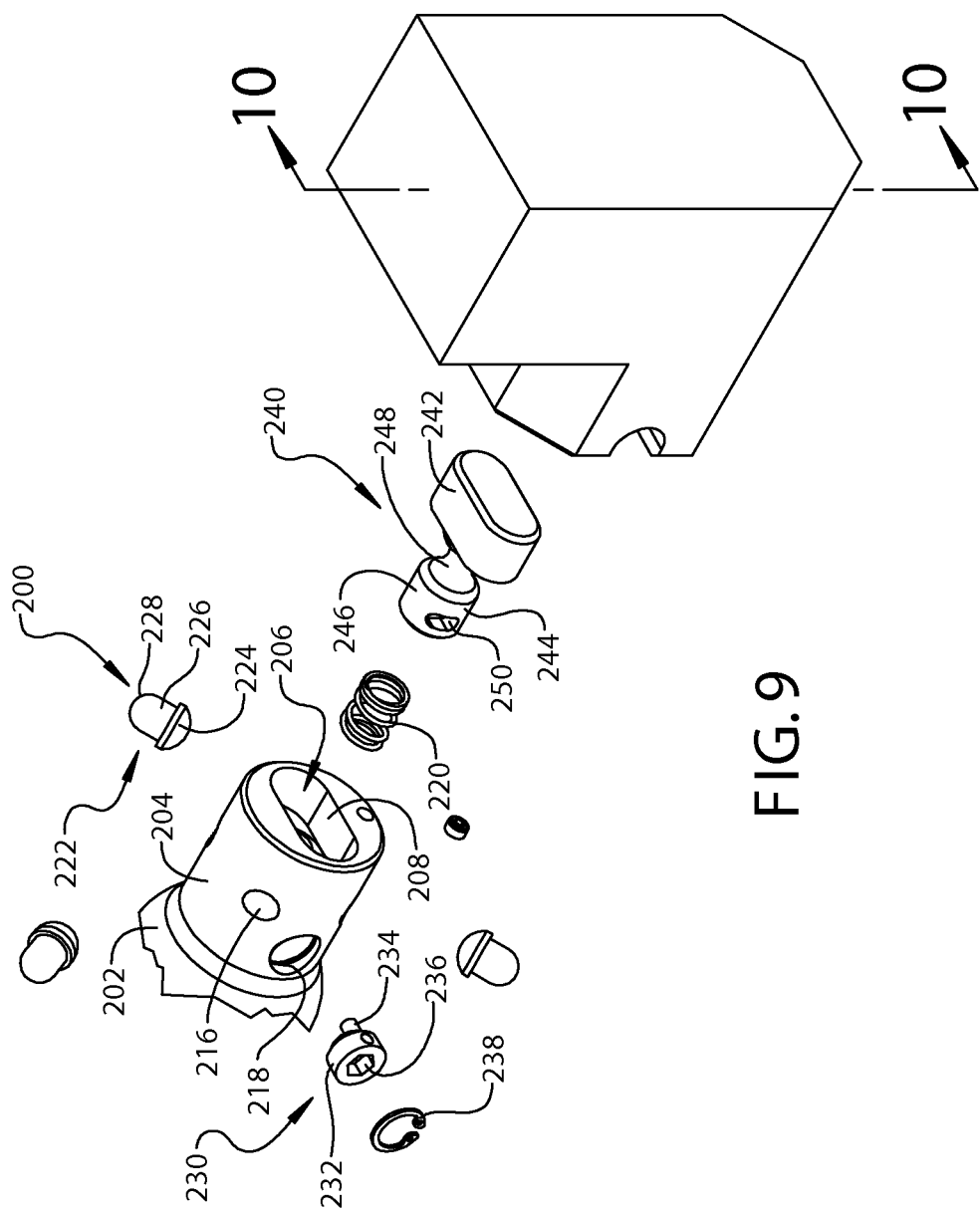
Figure 10A:
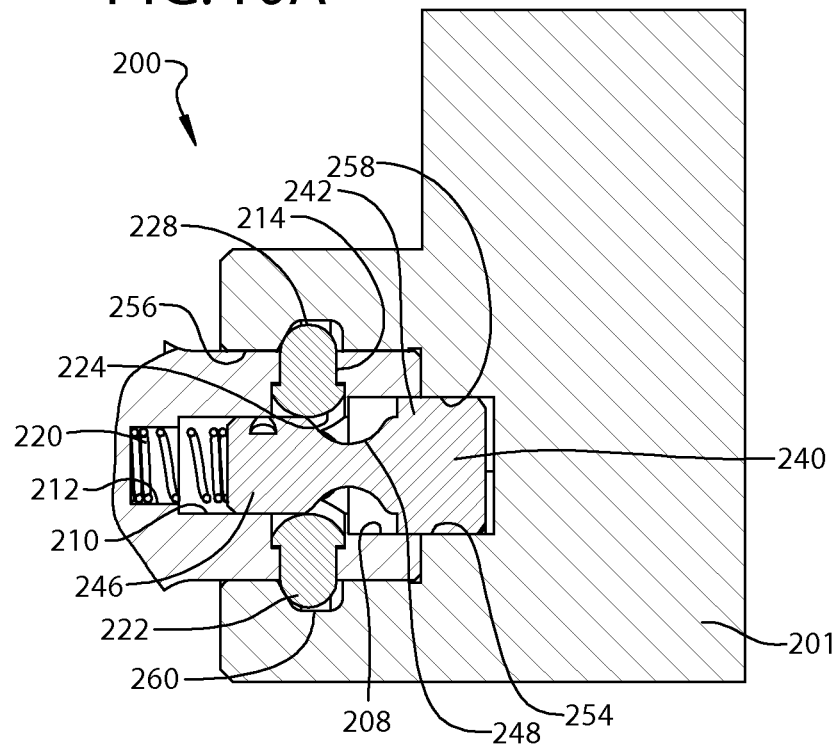
Figure 11:
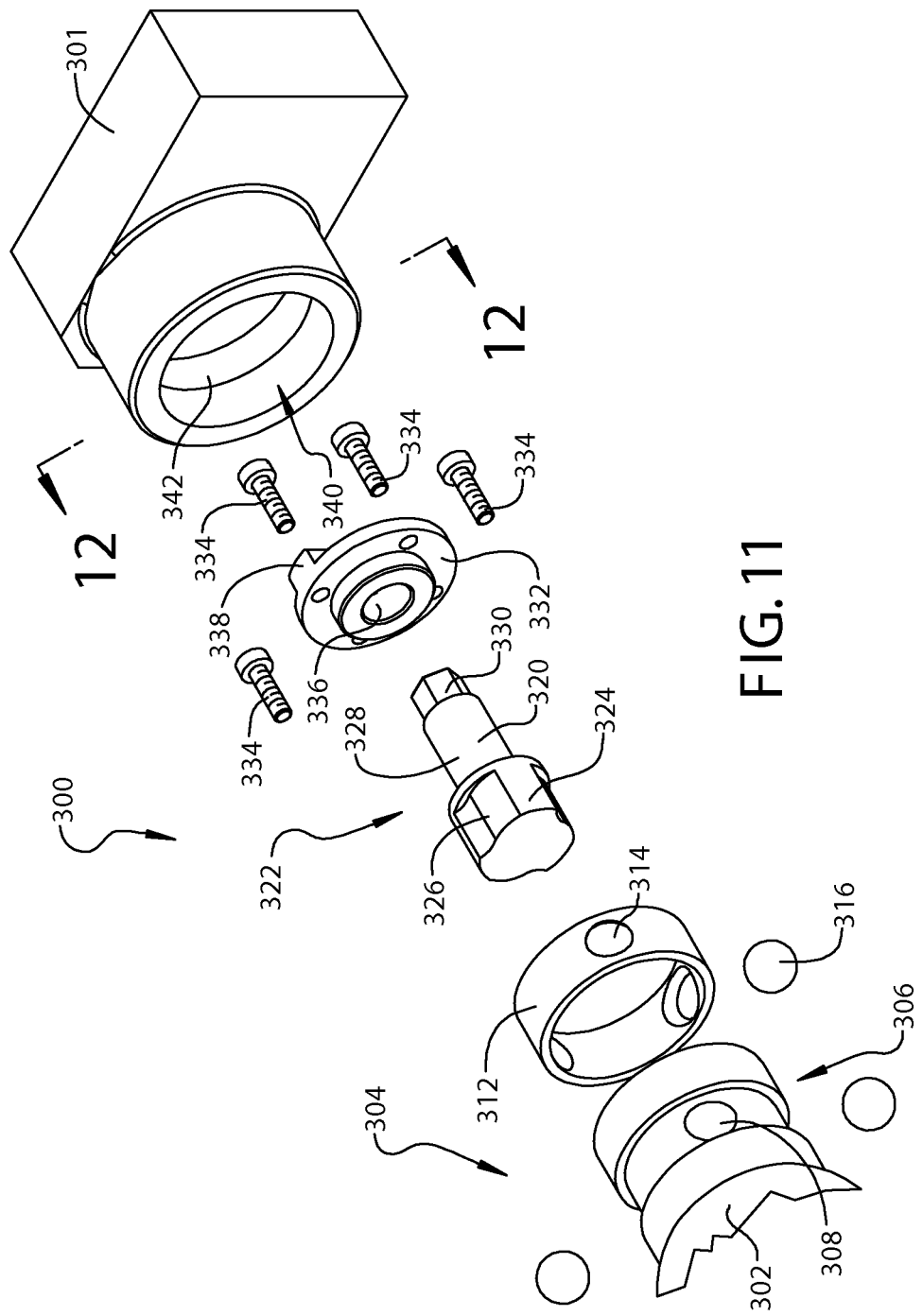
Figure 12A:
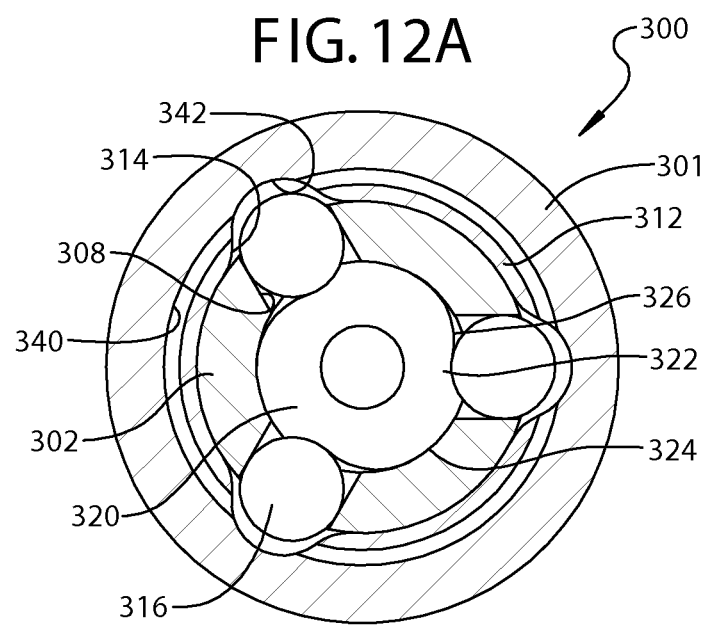
Figure 13:
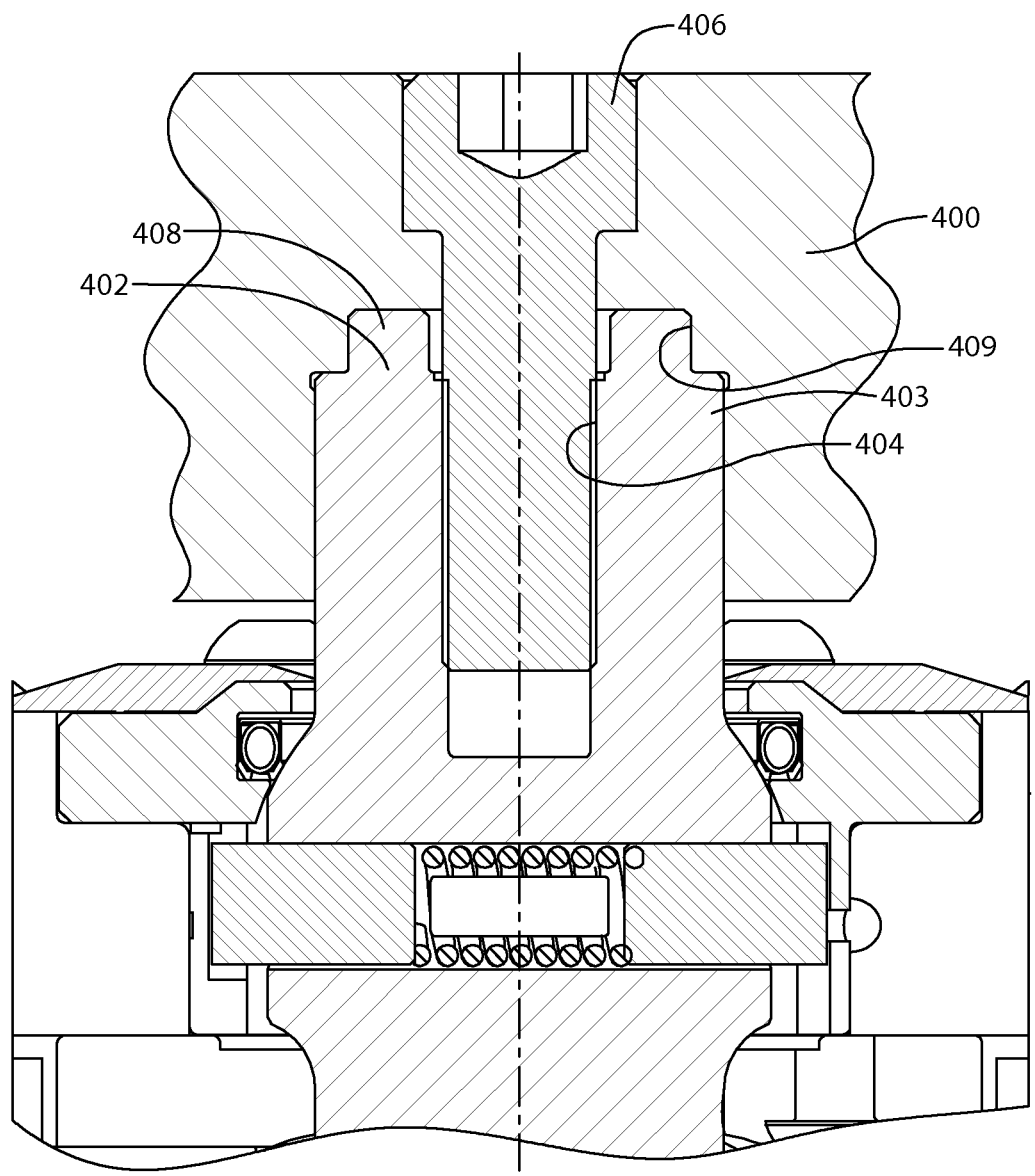
Figure 14:
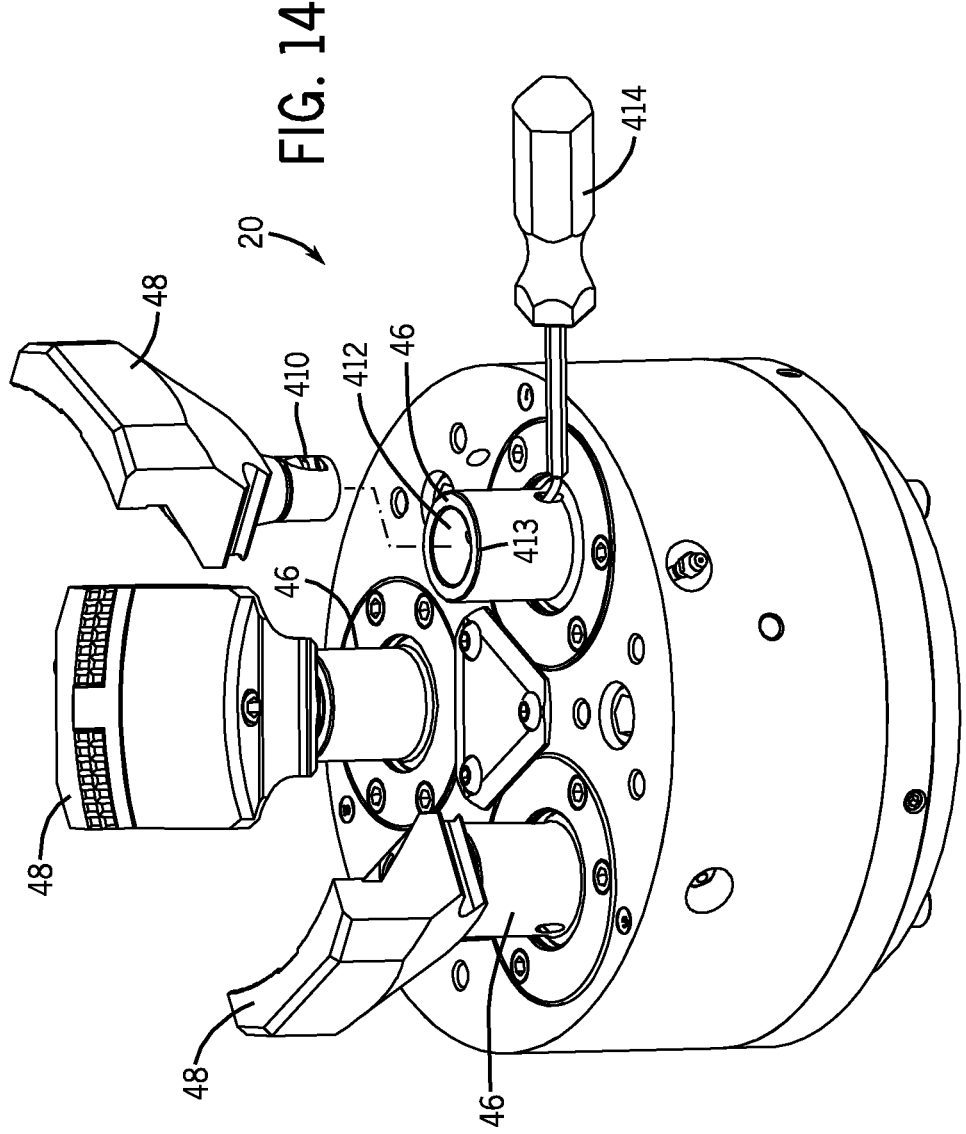
Figure 15:
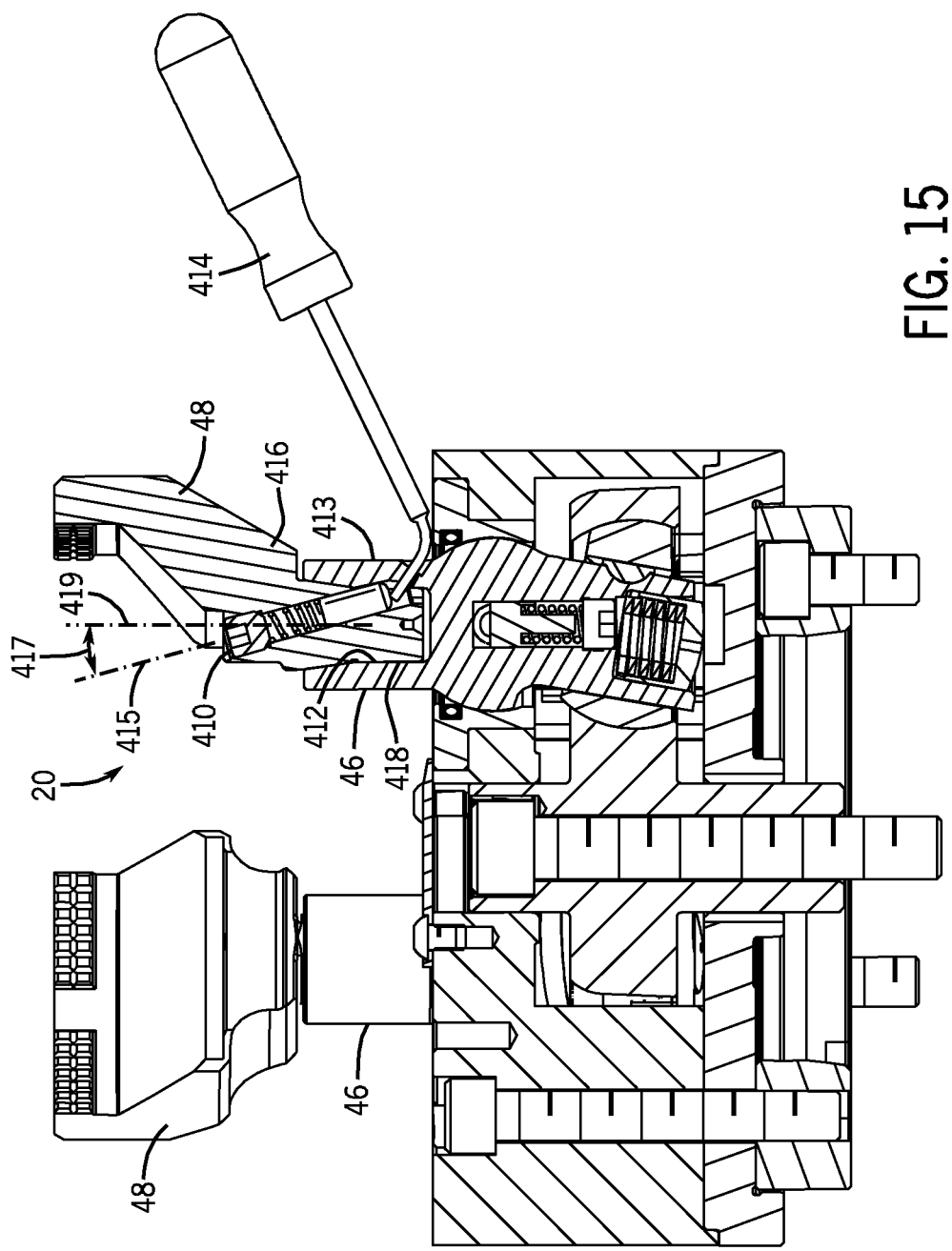
Figure 16:
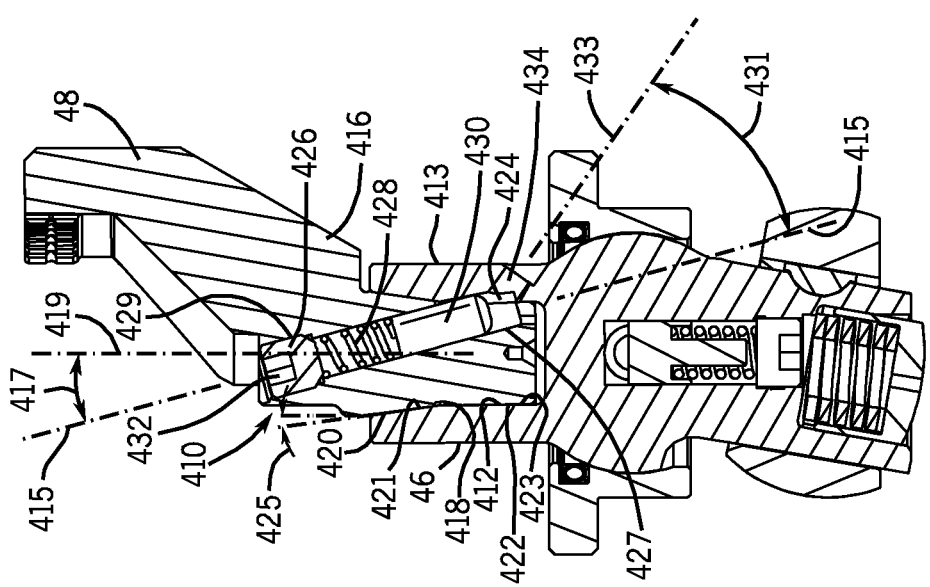
Figure 17:
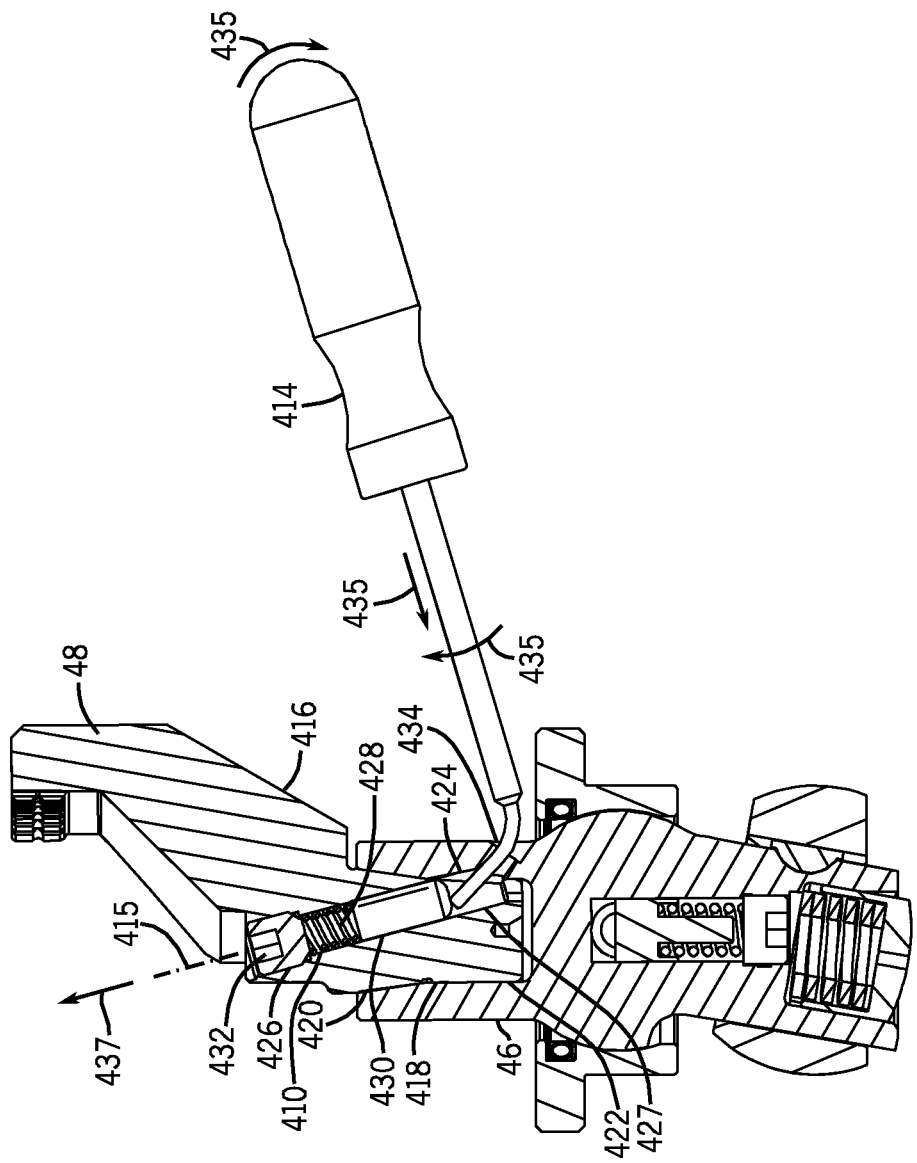
Figure 18:
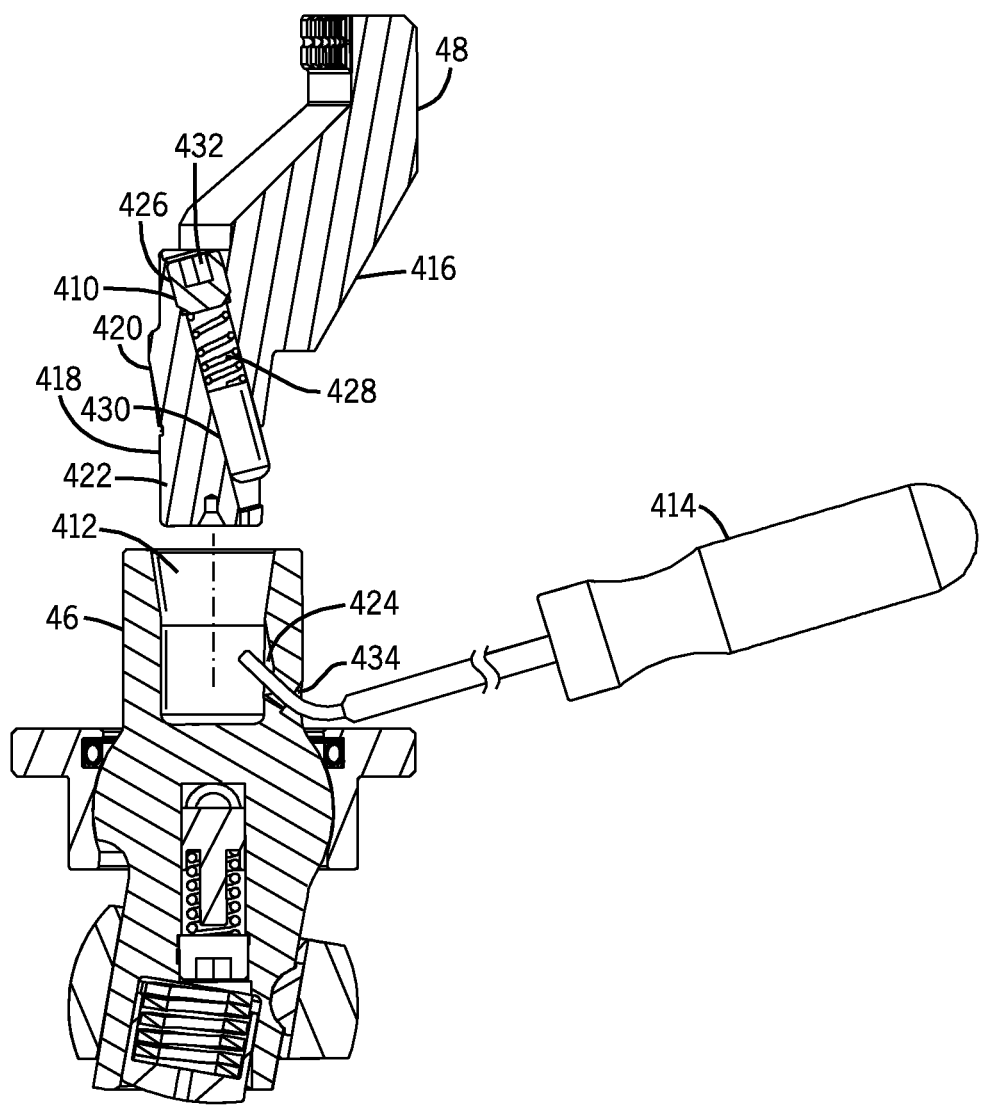
Figure 19:
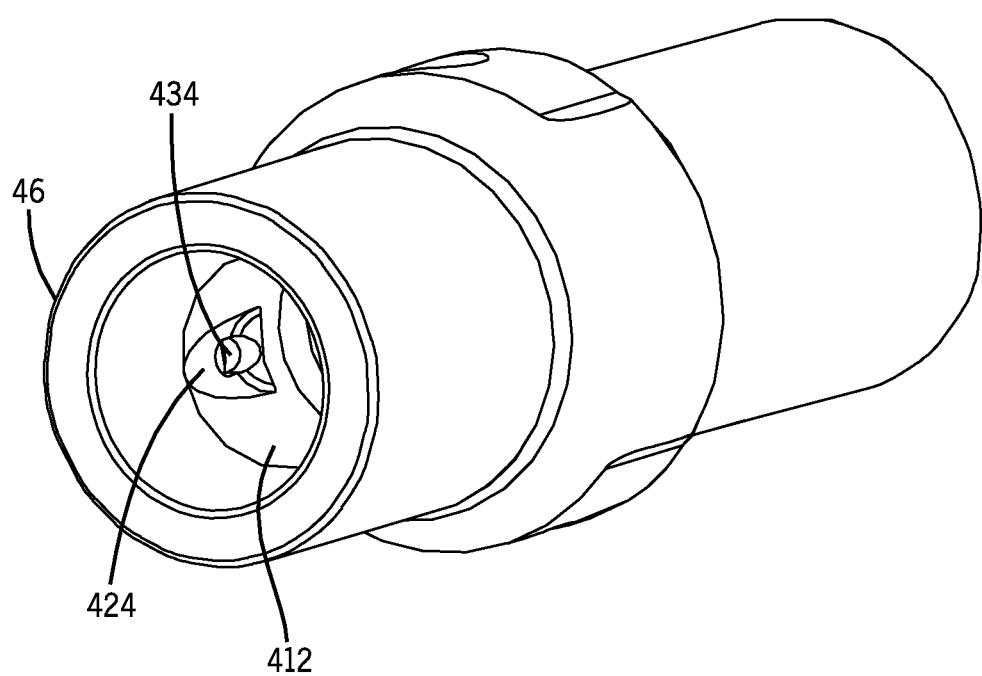

FIGS. 4A and B are cross-sectional views along line 4-4 of FIG. 2 showing an embodiment of the jaws in a retaining and releasing position, respectively;

FIG. 5 is an exploded assembly view of an embodiment of a first actuator arm assembly utilizing a single-piece bearing and a first quick-release mechanism;

FIG. 6 is a perspective view of an embodiment of the single-piece bearing of FIG. 5;

FIG. 7 is a bottom plan view of an embodiment of the single-piece bearing of FIG. 6;

FIGS. 8A and B are enlarged fragmented cross-sectional views of an embodiment of the first actuator arm assembly along line 8-8 of FIG. 2 with the quick-release mechanism in a released and engaged position, respectively;

FIG. 9 is a fragmented exploded view of an embodiment of a second actuator arm assembly utilizing a second quick-release mechanism;

FIGS. 10A and B are fragmented cross-sectional views of an embodiment of the assembled second actuator arm assembly along line 10-10 of FIG. 9 with the second quick-release mechanism in a released and engaged position, respectively;

FIG. 11 is a fragmented exploded view of an embodiment of a third actuator arm assembly utilizing a third quick-release mechanism;

FIGS. 12A and B are cross-sectional views of an embodiment of the assembled third actuator assembly along line 12-12 of FIG. 11 with the quick-release mechanism in a released and engaged position, respectively;

FIG. 13 is a fragmented cross-sectional view of an embodiment of a fourth actuator arm assembly showing the use of a single retaining bolt to secure a jaw thereto;

FIG. 14 is a perspective view of an embodiment of a fifth actuator arm assembly utilizing a fifth quick-release mechanism having a spring-loaded lock pin;

FIG. 15 is a cross-sectional view of an embodiment of the fifth quick-release mechanism of FIG. 14;

FIG. 16 is a cross-sectional view of an embodiment of the assembly of FIG. 14 with the spring-loaded lock pin in a locked position;

FIG. 17 is a cross-sectional view of an embodiment of the assembly of FIG. 14 with the spring-loaded lock pin in an unlocked position;

FIG. 18 is an exploded cross-sectional view of an embodiment of the assembly of FIG. 14 with the jaw removed from the actuator arm; and FIG. 19 is a perspective view of an embodiment of the actuator arm of FIG. 14.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain disclosed embodiments of the single-piece bearing chuck may reduce jaw reconfiguration time by employing a quick-release mechanism. The quick-release mechanism may enable an operator to rapidly remove one set of jaws and attach a second set of jaws. In one embodiment, this quick-release mechanism includes a spring-loaded lock pin that secures each jaw to a respective actuator arm. Each jaw may be configured to fit within a cavity inside a generally annular wall of each respective actuator arm. In certain embodiments, the jaw and cavity include a generally conical shape and a generally cylindrical shape. The spring-loaded lock pin may extend angularly through the actuator arm and jaw between a locked and unlocked position. By inserting a jaw release tool into a recess in the actuator arm, a spring in the spring-loaded lock pin may be compressed, facilitating removal of the jaw from the actuator arm. A different jaw may then be attached to the actuator arm by inserting a shaft portion of the jaw into a cavity in the actuator arm. Other embodiments, presented below, may also facilitate rapid jaw reconfiguration.

Figure 1A:
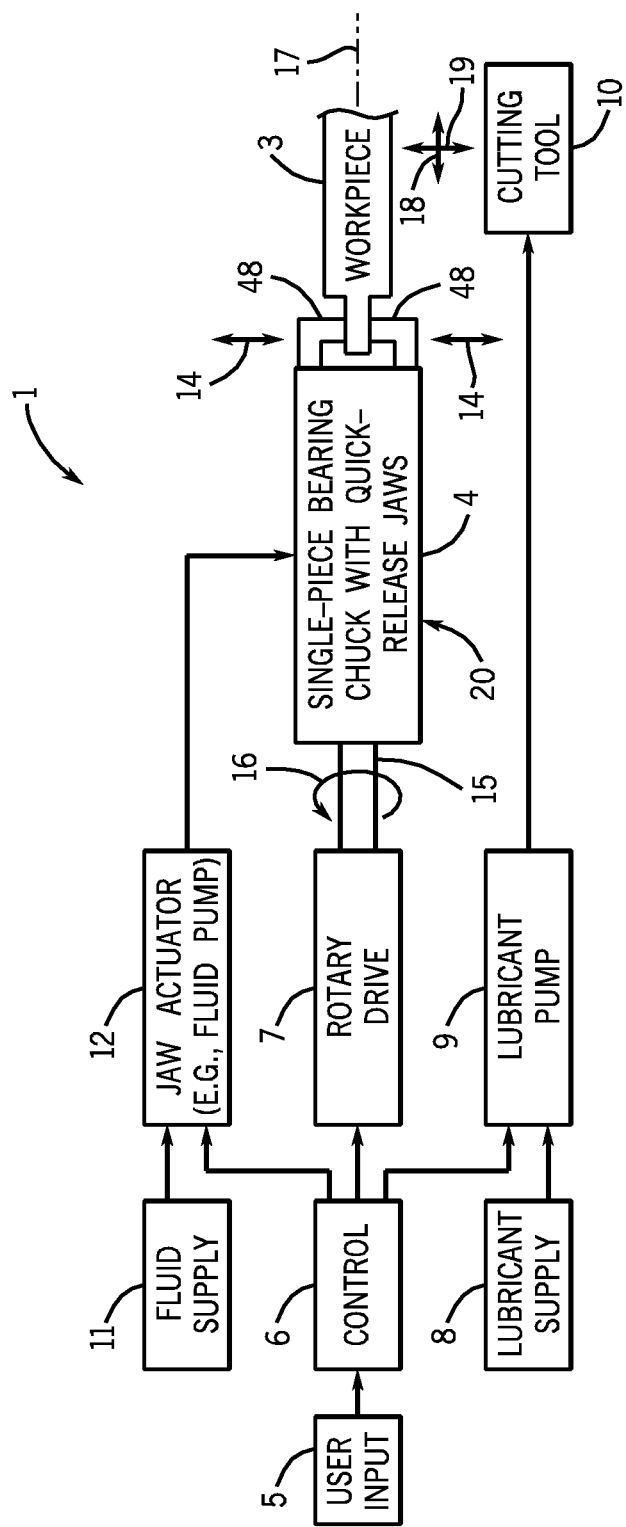
FIG. 1A is a block diagram of an embodiment of a system having a single-piece bearing chuck with quick-release jaws.
Figure 1B:
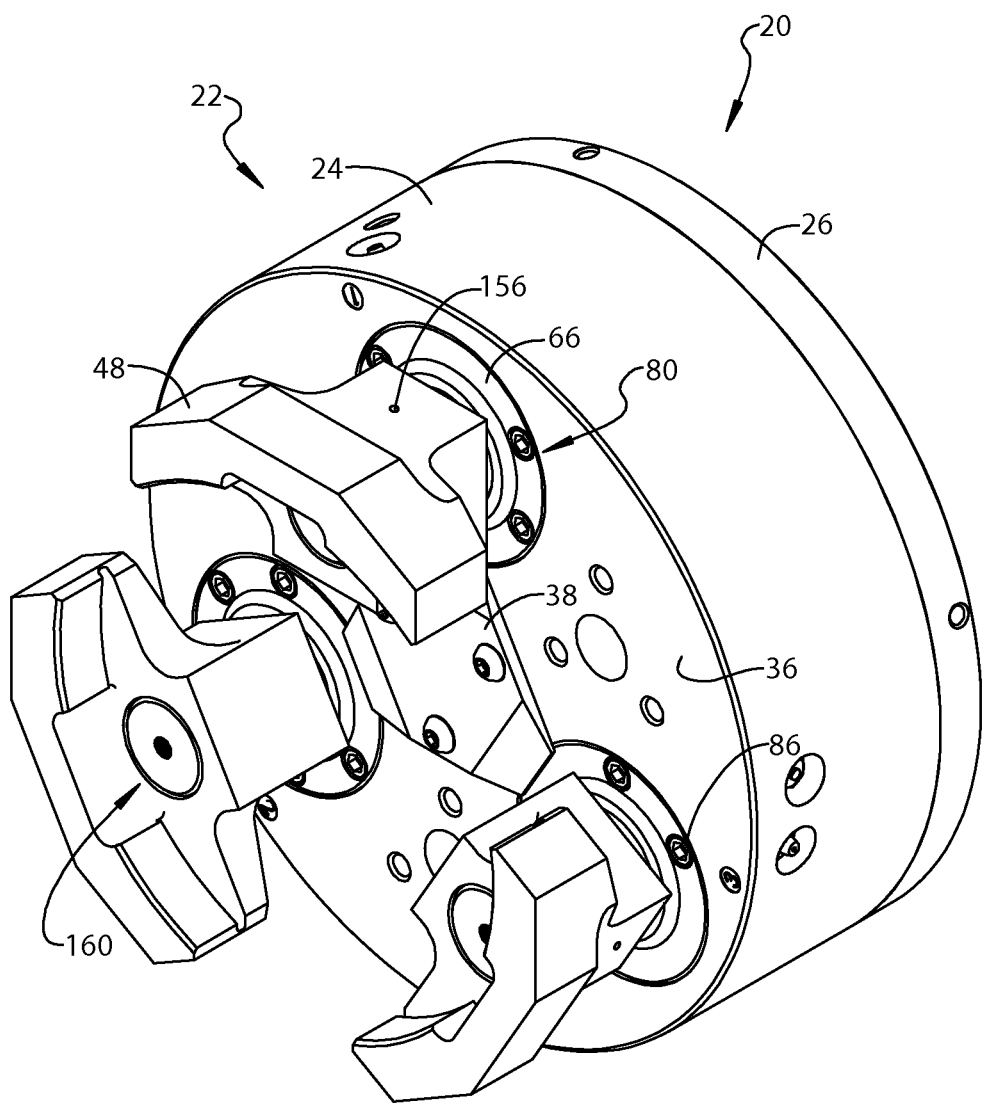
FIG. 1B is a perspective view of an embodiment of the chuck as shown in FIG. 1A.

FIG. 1A is a block diagram of an embodiment of a system 1 utilizing a chuck 20 with quick-release jaws and a single-piece bearing to secure a workpiece 3. As illustrated in FIG. 1A, the system 1 includes a user input 5, a control 6, a rotary drive 7 (e.g., an electric motor), a lubricant supply 8, a lubricant pump 9, a cutting tool 10, a fluid supply 11, and a jaw actuator 12 (e.g., a fluid pump). In certain embodiments, the chuck 20 includes a plurality of jaws 48 (e.g., quick-release jaws) configured to expand and contract as indicated by arrows 14, thereby opening and closing onto the workpiece 3. The rotary drive 7 couples to the chuck 20 via a shaft 15 or another suitable connection to enable rotation as indicated by arrow 16. Thus, the rotary drive 7 provides torque to rotate the chuck 20, thereby rotating the workpiece 3 held by the plurality of jaws 48.

The illustrated control 6 is configured to control the rotary drive 7, the lubricant pump 9, the cutting tool 10, and the jaw actuator 12 via pre-set controls and/or the user input 5. For example, the control 6 may control the cutting tool 10 to move lengthwise along an axis 17 as indicted by arrow 18, radially inward and outward relative to the axis 17 as indicated by arrow 19, or a combination thereof. The cutting tool 10 may include a variety of blades, such as a lathe cutting tool. In addition, the control 6 may control the lubricant pump 9 to provide lubricant from the lubricant supply 8 to the cutting tool 10, the workpiece 3, or a combination thereof. The control 6 also may control the jaw actuator 12 to expand and contract the plurality of jaws 48 as indicated by arrows 14. In one embodiment, the jaw actuator 12 is a fluid pump, such as a hydraulic pump, which provides fluid from the fluid supply 11 to a fluid driven mechanism within the chuck 4 to actuate the opening and closing of the jaws 48. However, any suitable actuation mechanism may be used for opening and closing the jaws 48.

Referring to FIG. 1B-FIG. 4, a workholding chuck assembly 20 according to the disclosed embodiments is shown. The chuck 20 includes a housing subassembly 22 that includes a main body 24 and an end plate 26 attached in a sealing arrangement to a rear portion of the main body 24. A cavity 28 is formed between the main body 24 and the end plate 26. An actuator plate 30 is disposed in the cavity 28 and can move axially within the cavity 28 to allow the chuck 20 to retain and release workpieces as described below.

The actuator plate 30 includes a front hub 32 that resides within a central bore 34 in a front face 36 of the main body 24. A cover plate 38 is disposed over the central bore 34 in the front face 36 to block debris and other contamination from entering into the cavity 28 and the housing subassembly 22. The end plate 26 includes a central bore 40 that is configured to receive a rear hub 42 of the actuator plate 30. In this manner, the actuator plate 30 is supported for axial movement within the cavity 28 of the housing subassembly 22.

The end plate 26 and the main body 24 can include a plurality of openings 44, 45 that can be used to attach the housing subassembly 22 to an adaptor plate, which provides a proper bolt pattern for securing the chuck 20 to an appropriate lathe or other machining apparatus.

Figure 4B:
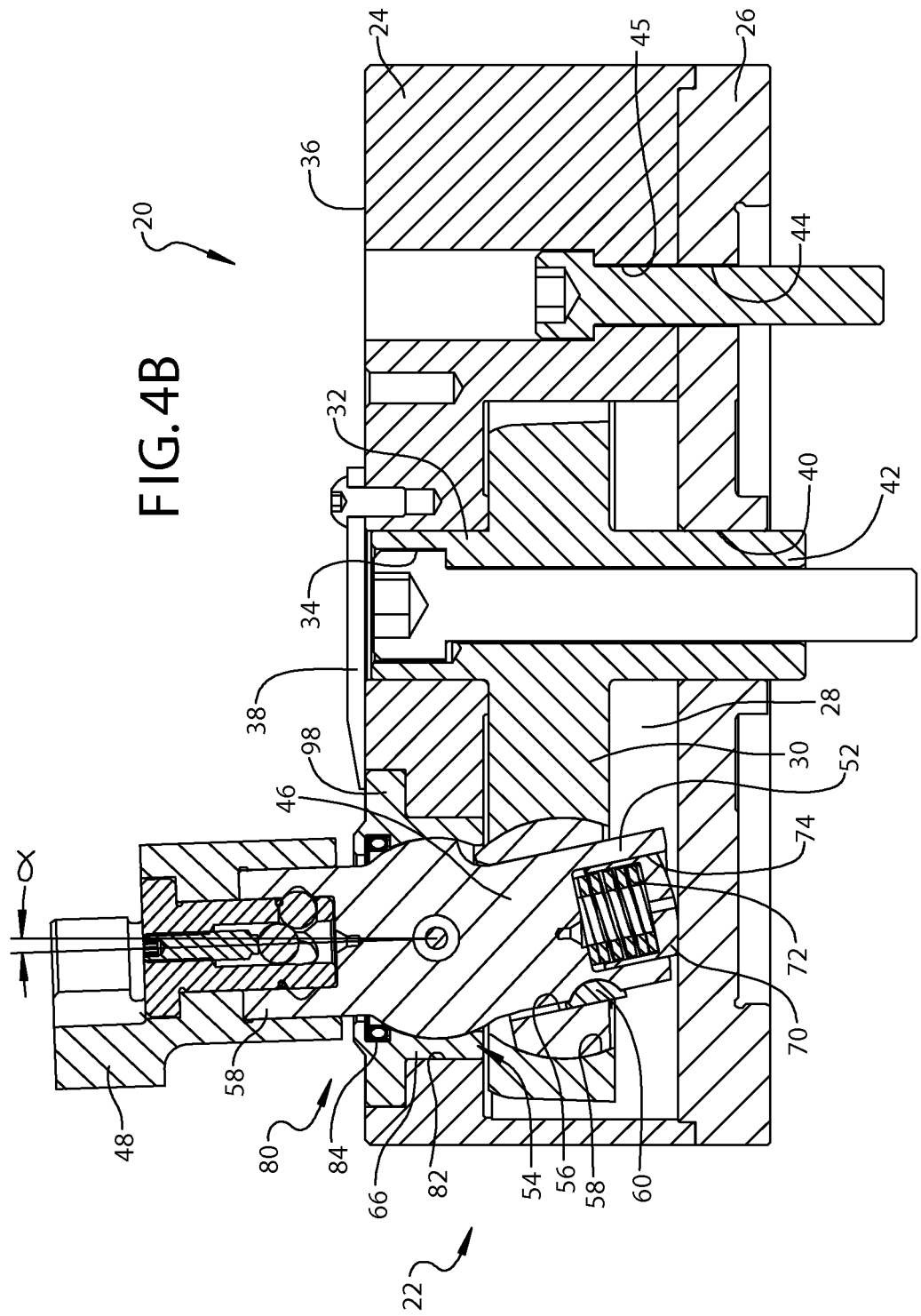

A plurality of actuator arms 46 is arranged within the housing subassembly 22 and can have a jaw 48 attached thereto. The actuator arms 46 can pivot about an axis within the housing subassembly 22 to cause the jaws 48 to move radially to retain and release a workpiece as described below. The actuator arms 46 are post-style arms that have a generally cylindrical front portion 50, a generally cylindrical rear portion 52, and a semi-spherical middle portion 54. The front and rear portions 50, 52 are axially offset from one another (not axially aligned), as shown in FIG. 4. The rear portion 52 is disposed within a rear bearing 56 having a generally semi-spherical exterior. The rear bearing 56 is disposed within an opening 58 in the actuator plate 30. The opening 58 has a concave inner periphery that is generally complementary to the generally semi-spherical exterior of the rear bearing 56. A key 60 blocks relative rotation between the rear portion 52 and the rear bearing 56. The middle portion 54 of the actuator arm 46 is disposed in a front bearing 66. The rear bearing 56 and the semi-spherical middle portion 54 of the actuator arm 46 are on a same front-rear center line. An end cap 70 and a spring 72 are disposed in a central bore 74 in the rear portion 52 of the actuator arm 46. The spring 72 biases the end cap 70 rearwardly and rides along the front surface of the end plate 26. The end cap 70 and the spring 72 thereby bias the actuator arm 46 forwardly and against the front bearing 66. The interior bore of the rear bearing 56 is offset and angled such that axial movement of the actuator plate 30 and the rear bearing 56 causes the actuator arm 46 to pivot within the front bearing 66 through an angle α relative to a front-rear center line of the front bearing 66, as shown in FIG. 4B. This pivoting motion of the actuator arms 46 moves the jaws 48 radially between a retaining position, as shown in FIG. 4A, and a releasing position, as shown in FIG. 4B, to grasp and release a workpiece, respectively.

Referring now to FIGS. 4-8, the actuator arm 46 is maintained within the chuck 20 by a front bearing assembly 80, which is secured to a stepped axial bore 82 in the front face 36 of the main body 24. The front bearing assembly 80 includes the front bearing 66, a seal ring assembly 84, and a plurality of retaining fasteners 86.

The front bearing 66 is a unitary non-split bearing that retains the actuator arm 46 within the housing subassembly 22. The front bearing 66 includes a generally circular front flange portion 94 and a generally cylindrical rear portion 96 extending rearwardly from the flange portion 94. The front bearing 66 is disposed within a stepped bore 82 in the front face 36 of the main body 24. The flange portion 94 includes a plurality of openings 100 that can receive fasteners 86 to secure the front bearing 66 to the housing subassembly 22. The front bearing 66 includes a central through opening 101 within which the actuator arm 46 is disposed. The central opening 101 includes an annular channel 102 in the flange portion 94 within which the seal ring assembly 84 is disposed. The seal ring assembly 84 includes a generally U-shaped annular member 104 with an annular spring 106 disposed therein. The annular spring 106 helps maintain contact between the annular member 104 and the exterior surface of the actuator arm 46 so as to retain grease within the front bearing 66.

The central opening 101 in the rear portion 96 of the front bearing 66 includes a front annular section 110 having a first radius and a rear annular section 112 rearward of the front annular section 110 having a second radius. The first and second radii can be the same. The first and second radii centers can be different. The rear portion 96 includes two axially extending pockets 116 that are spaced 180° apart. The pockets 116 are extended radially into front and rear sections 110, 112 to allow the semi-spherical middle portion 54 of the actuator arm 46 to be disposed therein, as described below.

Each pocket 116 includes a radial recess 118 that extends axially along the pocket 116. The recesses 118 work in conjunction with a homing mechanism 120 to allow limited rotational movement between the actuator arm 46 and the front bearing 66, as described below.

The rear portion 96 includes a removable wall portion 122 that forms part of one of the pockets 116 and includes the associated recess 118. The removable wall portion 122, as best seen in FIG. 7, includes convex sidewalls 124 that engage with complementary concave sidewalls 126 in the rear portion 96. Engagement between the convex sidewalls 124 and the concave sidewalls 126 radially secures the removable wall portion 122 within the rear portion 96. As a result of this engagement, the removable wall portion 122 is removed by axial movement relative to the rear portion 96. A set screw 128 (shown in FIG. 5) axially retains the removable wall portion 122 within the rear portion 96.

The semi-spherical middle portion 54 of the actuator arm 46 has a pair of opposing flats 132 that are spaced 180° apart with spherical surfaces 134 therebetween. The flats 132 allow the actuator arm 46 and the middle portion 54 to be inserted into the front bearing 66. Specifically, to insert the actuator arm 46 into the front bearing 66, the flats 132 are aligned 90° out of phase with the pockets 116 in the front bearing 66. With this alignment, spherical surfaces 134 are aligned with the pockets 116. This alignment allows the middle portion 54 to axially slide into the opening 101 and into the rear portion 96. Once the middle portion 54 is within the rear portion 96 and engaged with the seal ring assembly 84, the actuator arm 46 and/or the front bearing 66 can be rotated 90° relative to one another so that the flats 132 are now aligned with the pockets 116. With this alignment, the spherical surfaces 134 engage with the front and rear sections 110, 112 of the rear portion 96 between the pockets 116. Engagement of the spherical surface 134 with the front and rear sections 110, 112 enable the actuator arm 46 to pivot within the front bearing 66 to allow radial movement of the jaws 48 to grip and release a workpiece, as described below.

The middle portion 54 includes a radially extending through an opening 136 that receives the homing mechanism 120. The homing mechanism 120 allows limited relative rotation between the actuator arm 46 and the front bearing 66. The homing mechanism 120 includes a pair of engaging members 140 having tapered tips 142, a spring 144, and a rod 146. As best seen in FIG. 8, the engaging members 140, the spring 144, and the rod 146 are disposed in the opening 136 in the middle portion 54 of the actuator arm 46. The spring 144 biases the engaging members 140 radially outwardly so that the tips 142 engage with the recesses 118 in the rear portion 96 of the front bearing 66. The rod 146 limits relative radial movement of the engaging members 140 toward one another. The engagement of the tips 142 with the recesses 118 allows limited relative rotation between the actuator arm 46 and the front bearing 66 while biasing the actuator arm 46 toward an aligned home position within the front bearing 66. This limited relative rotation facilitates the engagement of the jaw 48 with a workpiece. Specifically, when clamping a workpiece in the chuck 20, the engagement of the jaws 48 with the workpiece may involve some slight twisting of the jaws 48 relative to the workpiece to get a firm grip. This limited relative rotation is facilitated by the homing mechanism 120 associated with each actuator arm 46.

The removable wall portion 122 enables the homing mechanism 120 to be assembled in the opening 136. Specifically, when the actuator arm 46 is disposed in the front bearing 66, as described above, a first one of the engaging members 140 is inserted through the opening 136. The spring 144 and the rod 146 are then inserted into the opening 136. The other engaging member 140 can then be inserted into the opening 136 and forcibly pushed toward the other engaging member 140 and held in place against the force of the spring 144. The removable wall portion 122 can then be axially inserted into the rear portion 96 and the engagement of concave and convex sidewalls 126, 124 blocks the home mechanism 120 from coming out of the opening 136. The set screw 128 is then used to axially secure the removable wall portion 122 to the rear portion 96.

The jaws 48 are attached to the front portions 50 of the actuator arms 46. As shown in FIG. 5, the front portion 50 of the actuator arm 46 can include a pair of axially extending tangs 150. The tangs 150 can be offset (eccentric) relative to an axially extending center line of the front portion 50. The tangs 150 can engage with complementary offset recesses 152 in an interior stepped through a bore 154 of the jaw 48. The jaw 48 includes a vent opening 156 to facilitate the positioning/removing the jaw 48 on/from the actuator arm 46. Engagement of the tangs 150 with complementary offset the recesses 152 in the jaw 48 blocks relative rotational movement between the jaw 48 and the actuator arm 46.

According to the disclosed embodiments, the jaws 48 can be removably secured to the front portions 50 of the actuator arms 46 with a quick-release mechanism. A first quick-release mechanism 160, as best seen in FIGS. 5 and 8, uses a central bore 162 in the front portion 50 of the actuator arm 46 to secure the jaw 48 thereto. The central bore 162 includes a radially extending annular channel 164 to facilitate the retaining of the jaw 48 to the actuator arm 46. The quick-release mechanism 160 also includes an axially extending retaining member 166 having a head 168 and a stem 170. A central bore 172 extends axially through the retaining member 166. The central bore 172 includes a first portion 174 adjacent the head 168 that has a first diameter and a second portion 176 adjacent the end of a stem 170 having a second diameter larger than the first diameter. The first portion 174 is threaded. A threaded fastener 178 is disposed in the central bore 172 and engages with the threads in the first portion 174. The quick-release mechanism 160 also includes a first set of retaining balls 180 having a first diameter and a single actuating ball 182 larger than the retaining balls 180. Three radially extending openings 184 extend through the stem 170 adjacent its end. The openings 184 can be equally spaced about the periphery of the stem 170.

Figure 8B:
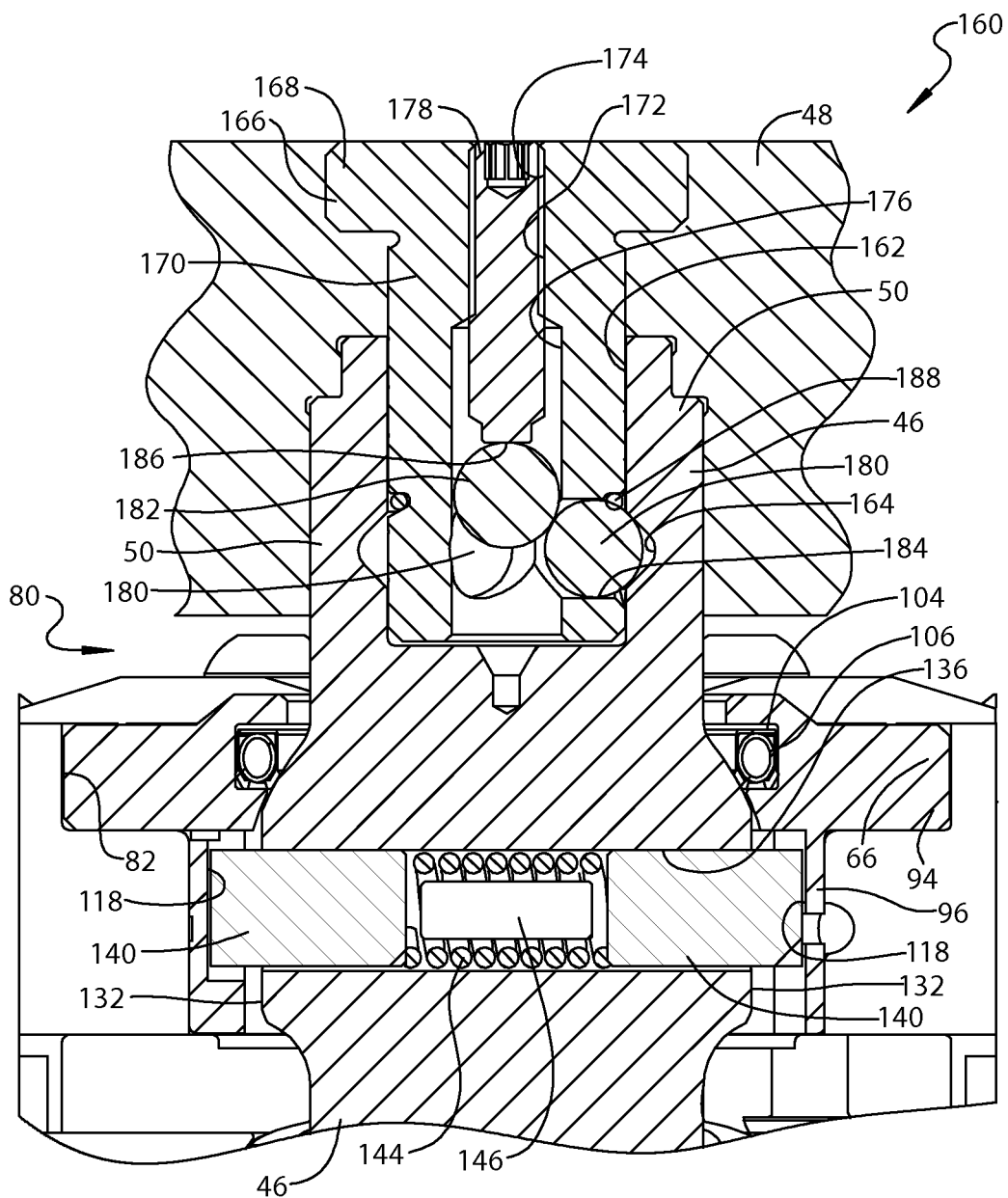

The actuating ball 182 and the retaining balls 180 are disposed in the second portion 176 of the central bore 172 with the retaining balls 180 aligned with the openings 184. The actuating ball 182 is disposed between the retaining balls 180 and an end 186 of the fastener 178. Retaining rings 188 (FIG. 8 only) can be disposed in the openings 184 to inhibit the retaining balls 180 from being pushed entirely through the openings 184. Non-removing axial movement of the fastener 178 relative to the retaining member 166 allows the quick-release mechanism 160 to secure the jaw 48 to the actuator arm 46, as shown in FIG. 8B, and allows the jaw 48 to be removed from the actuator arm 46, as shown in FIG. 8A. Specifically, as shown in FIG. 8B, when the fastener 178 is rotated in the appropriate direction a few rotations relative to the retaining member 166, the end 186 pushes the actuating ball 182 rearwardly into the retaining balls 180. This movement causes the retaining balls 180 to move radially outwardly into the openings 184 and protrude beyond the outer periphery of the stem 170 and into the annular channel 164. In this position, the retaining member 166 is secured to the actuator arm 46 and thereby retains the jaw 48 on the actuator arm 46.

When it is desired to remove the jaw 48 from the actuator arm 46, the fastener 178 is rotated the opposite direction relative to the retaining member 166. With a few rotations of the fastener 178, the end 186 no longer presses the actuating ball 182 against the retaining balls 180. The jaw 48 can then be pulled away from the actuator arm 46. The sloping nature of the annular channel 164 causes a radially inward force to be exerted on the retaining balls 180, thereby pushing the retaining balls 180 into the stem 170. The movement of the retaining balls 180 back into the stem 170 allows the jaw 48 to be removed from the front portion 50 of the actuator arm 46.

Thus, the quick-release mechanism 160 enables the jaws 48 to be quickly and easily attached to and removed from the actuator arms 46. the fastener 178 is not removed from the retaining member 166 during the operation of the quick-release mechanism 160. Rather, a few simple turns of the fastener 178 allows sufficient clearance between the end 186 and the actuating ball 182 to allow the retaining member 166 to disengage from the actuator arm 46. Conversely, a few simple turns of the fastener 178 in an opposite direction cause enough movement in the actuating ball 182 to push the retaining balls 180 into the annular channel 164 and secure the retaining member 166 to the actuator arm 46. The quick-release mechanism 160 thereby provides an easy and efficient way to change the jaws 48 so that the chuck 20 can be configured to receive different workpieces.

Referring now to FIGS. 9 and 10, a second quick-release mechanism 200 that can be used to secure the jaw 201 to an actuator arm 202 is shown. The middle and rear portions of the actuator arm 202 are substantially the same as that discussed above with reference to the actuator arm 46. As such, the middle and rear portions are not shown nor discussed. A front portion 204 of the actuator arm 202, however, is different. The front portion 204 includes a central bore 206 that extends axially into the actuator arm 202. A first portion 208 of the central bore 206 adjacent the end is a radially elongated slot. A second portion 210 of the central bore 206 rearward of the first portion 208 is generally cylindrical. A third portion 212 is rearward of the second portion 210 and is also cylindrical but has a diameter that is smaller than the second portion 210. A radially extending an annular channel 214 is disposed in the second portion 210 of the central bore 206. Three stepped through openings 216 extend through the annular channel 214 to the outer periphery of the front portion 204. The openings 216 can be equally spaced about the periphery of the front portion 204. Another through opening 218 extends through the front portion 204 and into the second portion 210 of the central bore 206 rearwardly of the openings 216.

The quick-release mechanism 200 includes a spring 220 that is disposed in the third portion 212 of the central bore 206. A retaining member 222 is disposed in each opening 216 of the central bore 206. The retaining members 222 each include a rounded inner head 224 and a stem 226 extending therefrom having a rounded end 228. The stepped openings 216 engage with the shoulder of the inner head 224 to block the retaining members 222 from passing entirely through the openings 216. A camming member 230 is disposed in the opening 218. The camming member 230 includes a head 232 and a pin 234 extending therefrom. The pin 234 is eccentrically attached to the head 232 (i.e., the pin 234 is offset from the rotational axis of the head 232). The head 232 includes a tool recess 236 that is configured to receive a tool therein to rotate the camming member 230 within the opening 218. A snap ring 238 retains the camming member 230 in the opening 218 and allows the camming member 230 to non-removably rotate within the opening 218.

An actuating member 240 includes a head 242 and a stem 244 extending therefrom. The head 242 is complementary to a slotted first portion 208 of the central bore 206. The stem 244 includes an end portion 246 that is generally cylindrical with a diameter slightly smaller than the diameter of the second portion 210 of the central bore 206. A neck portion 248 of the stem 244 is disposed between the end portion 246 and the head 242. The neck portion 248 has a diameter that changes between the end portion 246 and the head 242 with a smallest diameter at a general midpoint location of the neck portion 248. The end portion 246 includes a slot 250 on a periphery thereof. The slot 250 receives the eccentric pin 234 of the camming member 230. Rotation of the camming member 230 pushes on the slot 250, which, in turn, moves the actuating member 240 axially within the central bore 206.

The jaw 201 has an axially extending stepped bore 254 that is configured to receive the front portion 204 of the actuator arm 202. A first portion 256 of the bore 254 is circular and is complementary to the exterior of the front portion 204 of the actuator arm 202. A second portion 258 of the bore 254 is slotted and is complementary to the slotted head 242 of the actuating member 240. The first portion 256 of the bore 254 includes a radially extending annular channel 260 that is configured to receive the ends 228 of the retaining members 222.

Figure 10B:
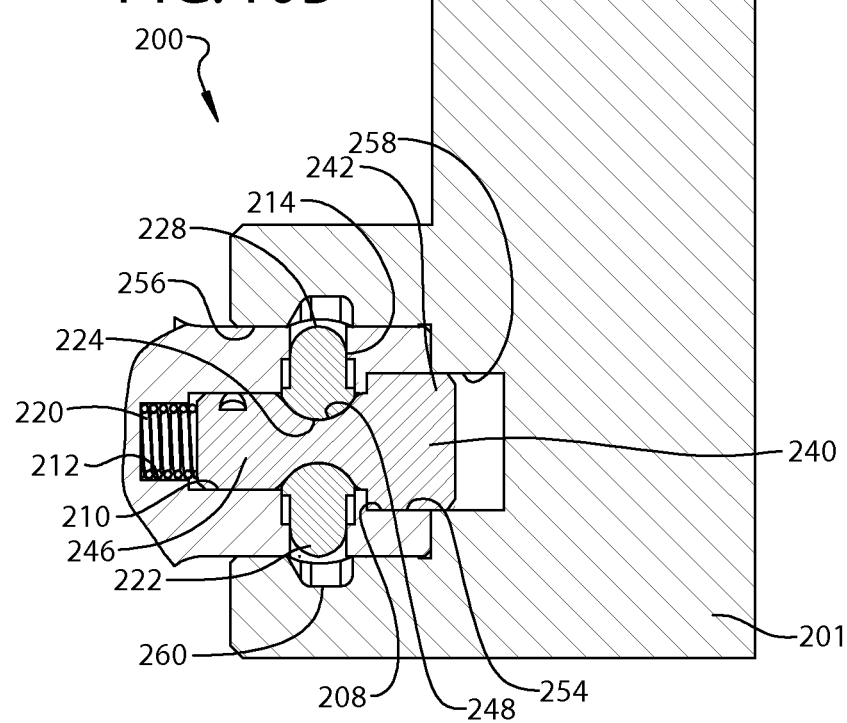

The quick-release mechanism 200 allows the jaw 201 to be easily and quickly secured to and removed from the actuator arm 202. Non-removing rotation of the camming member 230 moves the actuating member 240 axially between a release position, as shown in FIG. 10A, and a retaining position, as shown in FIG. 10B. The spring 220 biases the actuating member 240 toward the retaining position. When the quick-release mechanism 200 is in the engaged position, as shown in FIG. 10B, the jaw 201 is secured to the actuator arm 202 through the interaction of the retaining members 222 and the annular channel 260. Specifically, the spring 220 biases the actuating member 240 forwardly toward the jaw 201. As a result, the inner heads 224 of the retaining members 222 engage the end portion 246 of the actuating member 240. This engagement pushes the retaining members 222 radially outwardly such that the ends 228 engage with the annular channel 260. This engagement blocks the jaw 201 from being moved axially relative to the actuator arm 202. Additionally, with the actuating member 240 in the engaged position, the head 242 is disposed in the slotted second portion 258 of the stepped bore 254 and the jaw 201. The engagement of the head 242 with the slotted second portion 258 blocks relative rotation between the jaw 201 and the actuator arm 202. Thus, when in the engaged position, the jaw 201 is secured to the actuator arm 202 and the actuator arm 202 can be pivoted to allow the jaws 201 to retain and release a workpiece.

When it is desired to remove the jaw 201, the camming member 230 is non-removably rotated within the opening 218 with an appropriate tool. Rotation of the camming member 230 causes the pin 234 to push the actuating member 240 rearwardly within the actuator arm 202 against the biasing force of the spring 220. The rearward movement of the actuating member 240 results in the inner heads 224 of the retaining members 222 being aligned with the neck portion 248 of the actuating member 240, as shown in FIG. 10B. The jaw 201 can then be moved axially relative to the actuator arm 202. If the ends 228 of the retaining members 222 are protruding into the annular channel 260, the tapering nature of the annular channel 260 and the rounded nature of the ends 228 cause a radially inward force on the retaining members 222 such that the retaining members 222 move radially inwardly and into engagement with the neck portion 248 and allow the jaw 201 to be removed from the actuating arm 202. Once the jaw 201 has been removed from the actuator arm 202, the user can release the camming member 230, which can result in the actuating member 240 staying in place or moving forwardly under the influence of the spring 220.

To attach the jaw 201 to the actuating arm 202, the camming member 230 is rotated, if needed, to move the actuating member 240 rearwardly into the actuating arm 202, which allows the retaining members 222 to be moved radially inwardly. The rounded nature of the ends 228 can allow the jaw 201 to push the retaining members 222 radially inwardly when positioning the jaw 201 on the front portion 204 of the actuator arm 202. Once the jaw 201 is securely positioned on the actuator arm 202, the camming member 230 can be rotated to move the quick-release mechanism 200 to the engaged position, as shown in FIG. 10A. In some instances, the movement of the quick-release mechanism 200 from the disengaged to the engaged position may be done entirely as a result of the influence of the spring 220 once the camming member 230 is released from being held in the disengaged position.

Thus, the second quick-release mechanism 200 according to the disclosed embodiments can easily and quickly allow the jaws 201 to be attached to and removed from the actuator arms 202. It should be appreciated that the jaw 201 is shown as being a blank that can be machined to provide a desired gripping surface or features for retaining a workpiece therein.

Figure 12B:
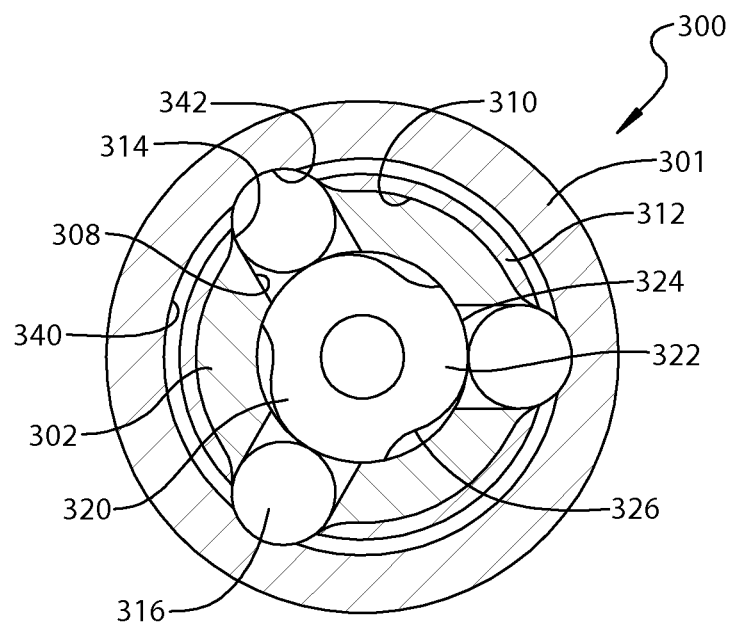

Referring now to FIGS. 11 and 12, a third quick-release mechanism 300 that allows quick and easy attachment/removal of a jaw 301 to/from an actuator arm 302 according to the disclosed embodiments is shown. In the third quick-release mechanism 300, the middle and rear portions of the actuator arm 302 are substantially the same as the middle and rear portions of the actuator arm 46 discussed above. As such, the middle and rear portions are not shown nor discussed. A front portion 304 of the actuator arm 302, however, is different. The front portion 304 is generally cylindrical and includes a radially inwardly extending recess 306 therein. A plurality of through openings 308 extends through the recess 306 into a central bore 310 of the front portion 304. A ring member 312 is configured to fit around the front portion 304 within the recess 306. The ring member 312 includes a plurality of tapered openings 314 that align with the openings 308 in the recess 306. A plurality of retaining balls 316 is disposed in the central bore 310 and can extend radially outwardly through the openings 308, 314. Radial movement of the retaining balls 316 relative to the openings 308, 314 allows the jaw 301 to be secured to and removed from the actuator arm 302, as described below.

An actuating member 320 includes a camming portion 322 having a plurality of generally cylindrical surfaces 324 with a plurality of ramps 326 disposed therebetween. The ramps 326 have a radial dimension that changes between adjacent cylindrical surfaces 324, as best seen in FIG. 12. A stem 328 extends forwardly from the camming portion 322 and includes a head 330 that can be engaged with a tool to non-removably rotate the actuating member 320 within the actuator arm 302 as described below.

An end plate 332 is configured to attach to the end of the front portion 304 to secure the actuating member 320 and the retaining balls 316 within the central bore 310 and to retain the ring member 312 on the front portion 304 of the actuator arm 302. The end plate 332 can be secured to the actuator arm 302 with a plurality of fasteners 334. The end plate 332 includes a central bore 336 through which the head 330 and the stem 328 of the actuating member 320 extend. A pair of tangs 338 extends from the end plate 332 and is offset from the central axis of the central bore 336. The tangs 338 engage with complementary offset recesses at the end of a central bore 340 of the jaw 301 to block relative rotation between the actuator arm 302 and the jaw 301.

The central bore 340 of the jaw 301 includes a radially extending annular channel 342. The annular channel 342 aligns with the openings 308, 314 when the jaw 301 is positioned on the actuator arm 302. Non-removing rotation of the actuating member 320 relative to the jaw 301 and the actuator arm 302 causes radial movement of the retaining balls 316 relative to the actuator arm 302 and the jaw 301 to allow the jaw 301 to be secured to and released from the actuator arm 302.

As shown in FIG. 12A, when the retaining balls 316 are engaged with the ramps 326 of the actuating member 320, the retaining balls 316 do not extend into the annular channel 342. In this position, the jaw 301 can be removed from or positioned on the actuator arm 302. To retain the jaw 301 to the actuator arm 302, the actuating member 320 is rotated relative to the actuator arm 302 and the jaw 301. This relative rotation causes the ramps 326 to push the retaining balls 316 radially outwardly through the openings 308, 314 and into the annular channel 342. With sufficient rotation, the cylindrical surfaces 324 engage with the retaining balls 316 to provide the maximum radially outward position for the retaining balls 316. In this position, the jaw 301 is axially secured to the actuator arm 302 by the retaining balls 316. The tangs 338 block relative rotation between the jaw 301 and the actuator arm 302.

To release the jaw 301, the actuating member 320 is rotated in the opposite direction so that the retaining balls 316 engage with the ramps 326 and can move radially inwardly. The annular channel 342 can have sloped surfaces such that axial movement of the jaw 301 relative to the actuator arm 302 can exert a radially inward force on the retaining balls 316 to facilitate movement of the retaining balls 316 radially inwardly when releasing the jaw 301.

Thus, the third quick-release mechanism 300 according to the disclosed embodiments can easily and quickly allow the jaws 301 to be secured to and removed from the actuator arms 302. Again, it should be appreciated that the jaw 301 is shown as a blank and can be machined to provide the desired gripping features for the jaw 301.

Referring now to FIG. 13, a cross-sectional view of another way to retain a jaw 400 to a front portion 402 of an actuator arm 403 is shown. Specifically, the front portion 402 includes a threaded central bore 404. A single-threaded fastener 406 can be secured in the central bore 404 to retain the jaw 400 on the front portion 402. The front portion 402 can include a pair of tangs 408 that are eccentric relative to an axial center of the central bore 404. The tangs 408 can engage with complementary recesses at an end of a bore 409 in the jaw 400 to block relative rotation between the jaw 400 and the actuator arm 403. Thus, if desired, the single-threaded fastener 406 can be used to retain the jaw 400 to the actuator arm 403. It should be appreciated, however, that the use of the single-threaded fastener 406 does not provide the quick-release capability described above with reference to the quick-release mechanisms 160, 200, and 300. Further, the single-threaded fastener 406 is removed to change the jaw 400.

FIG. 14 is a perspective view of a fifth embodiment of the chuck 20 having quick-release jaws 48. In this embodiment, jaws 48 may be secured to actuator arms 46 by spring-loaded lock pins 410. As discussed in detail below, the spring-loaded lock pins 410 may extend axially, radially, or a combination thereof, through the actuator arms 46 and/or jaws 48 to secure these components together. The spring force biases the pins 410 in a first direction into a locked position, whereas an opposite force in an opposite second direction compresses each spring to move the pins 410 to an unlocked position. Thus, the spring-loaded pins 410 enable a quick-locking mechanism and a quick-release mechanism for the jaws 48 with the actuator arms 46. In certain embodiments, as discussed below, the spring-loaded lock pins 410 may extend angularly through the actuator arms 46 and jaws 48 between the locked and unlocked positions.

As can be seen in FIG. 14, jaws 48 may be inserted into cavities 412 within the actuator arms 46. In other words, the actuator arms 46 and the jaws 48 are in a coaxial arrangement, wherein the actuator arms 46 have a generally annular wall 413 disposed about the jaws 48 within the cavities 412. Thus, the outer diameter of the jaws 48 is less than the outer diameter of the actuator arms 46. This coaxial configuration with the jaws 48 inside the actuator arms 46 may produce a lighter chuck 20 than those described in the above embodiments. As will be discussed in detail below, each jaw 48 may be separated from the actuator arm 46 by inserting a jaw release tool 414 into the actuator arm 46 and compressing the spring-loaded lock pin 410 away from a locked position to an unlocked position. While FIG. 14 illustrates this removal process for only one jaw 48, the same technique may be applied to the other jaws 48.

FIG. 15 is a cross section of the fifth embodiment of the chuck 20 as shown in FIG. 14, illustrating the jaw release tool 414 compressing the spring-loaded lock pin 410. The jaw 48 has a workpiece holding portion 416 and a shaft portion 418. As illustrated, the shaft portion 418 fits within the cavity 412 of the actuator arm 46. Once in the cavity 412, the jaw 48 may be held in place by the spring-loaded lock pin 410 located within the shaft portion 418. In the illustrated embodiment, the spring-loaded lock pin 410 extends through the shaft portion 418 of the jaw 48 between a locked position and an unlocked position relative to the annular wall 413 of the actuator arm 46. In particular, the spring-loaded lock pin 410 has a linear path of travel along an axis 415 at an angle 417 relative to a central longitudinal axis 419 of the actuator arm 46 and the jaw 48. In certain embodiments, the angle 417 may be greater than 0 degrees and less than 90 degrees. For example, the angle 417 may range between about 0 to 90 degrees, 0 to 60 degrees, 0 to 45 degrees, 0 to 30 degrees, or 0 to 15 degrees. By further example, the angle 417 may be about 5, 10, 15, 20, 25, 30, 35, 40, or 45 degrees, or any angle therebetween. As discussed further below, the spring-loaded lock pin 410 may interconnect the jaw 48 with the actuator arm 46 to block axial movement of the jaw 48 along the axis 419, rotational movement of the jaw 48 about the axis 419, or a combination thereof. The tool 414 may be used to create a counter force against the spring, thereby enabling movement of the spring-loaded lock pin 410 away from the locked position to the unlocked position.

FIG. 16 is a cross section of the jaw 48 and actuator arm 46 of the present embodiment. Similar to FIG. 15, this figure shows the shaft portion 418 inserted into the cavity 412 of the actuator arm 46. The shaft portion 418 may have a tapered section 420 (e.g., conical) and a straight section 422 (e.g., cylindrical), which are configured to mate with a tapered interior surface 421 and a straight cylindrical interior surface 423 of the cavity 412. The tapered section 420 may serve to align the jaw 48 with the actuator arm 46 such that the jaw 48 does not move independently of the actuator arm 46. In other words, the engagement of the tapered section 420 of the jaw 48 with the tapered interior surface 421 of the actuator arm 46 provides a tight fit (e.g., a zero or nearly zero tolerance fit) while also self-aligning the jaw 48 relative to the actuator arm 46. For example, the interface between the tapered section 420 and the surface 421 is generally conical and coaxial about the axis 419, thereby causing the jaw 48 to gradually move toward the axis 419 during insertion. Simultaneously, the generally conical interface eventually closes any gap or interference between the jaw 48 and the actuator arm 46, such that the jaw 48 can be more securely held within the cavity 412 of the actuator arm 46.

In contrast, if a straight shaft fits within a straight cavity, then the diameter of the shaft is less than the diameter of the cavity. The difference in diameter substantially reduces or eliminates the possibility of locking, e.g., a condition where friction between the shaft and the cavity prevents the shaft from being inserted. By slightly reducing the diameter of the shaft, it may pass freely into the cavity. Unfortunately, the smaller diameter may result in some movement of the shaft within the cavity. Thus, the tapered (e.g., conical) interface between the tapered section 420 and the surface 421 substantially reduces or eliminates the possibility of movement of the jaw 48 relative to the actuator arm 46 once held in place by the spring-loaded lock pin 410.

In certain embodiments, the shaft portion 418 and the cavity 412 may be tapered at an angle 425 to substantially reduce or eliminate the possibility of shaft movement within a cavity. For example, the angle 425 may range between about 1 to 30 degrees, 1 to 20 degrees, 1 to 15 degrees, or 1 to 10 degrees. In certain embodiments, the angle 425 may range between about 5 to 10 degrees or at least greater than 7.5 degrees. The angle 425 may be a locking angle or a non-locking angle. A non-locking angle may be defined as an angle greater than approximately 7.5 degrees, where a shaft may be inserted into a cavity of substantially equal diameter without resistance. If the angle 425 of taper is a non-locking angle, then the diameter of the tapered section 420 of the shaft portion 418 and the tapered interior surface 421 of the cavity 412 may be substantially the same. In such an embodiment, the shaft portion 418 may not move within the cavity 412 because the diameters are substantially the same. In the present embodiment, the angle 425 of the tapered section 420 relative to the straight section 422 may be approximately 8 degrees. In this configuration, the shaft portion 418 may be inserted into the cavity 412 having substantially equal diameter without resistance, while limiting jaw movement relative to the actuator arm 46.

While the diameter of the tapered section 420 may be substantially the same as the tapered interior surface 421, the diameter of the straight section 422 may be slightly less than the straight cylindrical interior surface 423 to facilitate insertion. However, because the tapered section 420 forms a tight fit with the tapered interior surface 421 of the cavity 412, the jaw 48 may not significantly move with respect to the actuator arm 46 despite the smaller diameter of the straight section 422. The straight section 422 may ensure that an operator removes the jaw 48 along the axis 419 of the cavity 412.

As mentioned above, the jaw 48 may be secured to the actuator arm 46 by the spring-loaded lock pin 410. In the illustrated embodiment, the pin 410 is spring-biased or spring-loaded within a passage 427 along the axis 415 toward a locked position within a recess 424 in the annular wall 413 of the actuator arm 46. Upon extending into the recess 424, the spring-loaded lock pin 410 blocks axial movement of the jaw 48 along the axis 419. In other words, the pin 410 retains the jaw 48 within the cavity 412 of the actuator arm 46 until an opposite force (e.g., via tool 414) biases the pin 410 away from the recess 424.

The angle 417 of the pin 410 relative to the shaft portion 418 may be any suitable angle as discussed above. For example, the angle 417 may be a non-locking angle of at least 7.5 degrees. If the angle 417 is a non-locking angle, then the spring-loaded lock pin 410 may move along the axis 415 in and out of the recess 424 without any gap between the pin 410 and the passage 427. In such an embodiment, the lock pin 410 may hold the jaw 48 in place while minimizing any motion of the jaw 48 relative to the actuator arm 46 due to the substantial reduction or elimination of an interference gap.

The spring-loaded lock pin 410 may include a head 426, a spring 428, and a dowel 430 disposed within the passage 427. The head 426 may be threaded and serve to secure the pin 410 to the jaw 48 by screwing into a tapped hole 429 within the passage 427 of the jaw 48. By inserting a tool within a tool recess 432, the head 426 may be rotated to adjust its depth in the tapped hole 429 of the passage 427, thereby altering the position of the pin 410 relative to the jaw 48. The spring 428 may be coupled to the head 426 to bias the dowel 430 into its locked position in the recess 424. In certain embodiments, the depth of the head 426 may be adjusted and secured in position during assembly. For example, the manufacturer may tack weld the head 426 in place such that an operator may not vary head depth by rotating the head 426 via the tool recess 432.

In the illustrated embodiment, the passage 427 containing the spring-loaded lock pin 410 leads to a tool opening or receptacle 434 near the recess 424. The receptacle 434 and the recess 424 are located in a base region of the cavity 412. The receptacle 434 is angled relative to the passage 427 and the axes 415 and 419. For example, the receptacle 434 may have an angle 431 between the axis 415 of the passage 427 and an axis 433 of the receptacle 434. The angle 431 may range between about 0 to 90 degrees, 0 to 60 degrees, 0 to 45 degrees, 0 to 30 degrees, or 0 to 15 degrees. For example, the angle 431 may be about 15, 20, 25, 30, 35, 40, or 45 degrees, or any angle therebetween. The receptacle 434 enables insertion of the tool 414 to bias the pin 410 away from the recess 424, thereby releasing the jaw 48 from the actuator arm 46.

FIGS. 17 and 18 are cross-sectional views of an embodiment of the chuck 20, illustrating the process of removing the jaw 48 from the actuator arm 46. As can be seen in FIG. 17, the tool 414 may extend through the receptacle 434 to engage the dowel 430 and compress the spring 428 between the dowel 430 and the head 426. In particular, the tool 414 may extend linearly and pivotally into the receptacle 434 and the passage 427 as indicated by arrows 435. As the spring 428 compresses, the tool 414 moves the dowel 430 away from the recess 424 toward the head 426, as indicated by arrow 437. Once the spring 428 has been sufficiently compressed, the dowel 430 may no longer block movement of the jaw 48 away from the actuator arm 46. As a result, withdrawal of the dowel 430 out of the recess 424 enables movement and removal of the jaw 48 from the cavity 412 of the actuator arm 46.

FIG. 18 shows the jaw 48 separated from the actuator arm 46. As can been seen from this figure, once the jaw 48 has been removed, the spring-loaded lock pin 410 may return to its original length. After the jaw 48 has been separated, the jaw release tool 414 may be removed from the receptacle 434. At this point, a different jaw 48 may be secured to the actuator arm 46. Because of the rounded tip of the dowel 430 and the angle of the spring-loaded lock pin 410 relative to the shaft 418, inserting the jaw 48 into the actuator arm 46 may compress the spring 428 and allow translation of the jaw 48. However, when the dowel 430 reaches the recess 424, the spring 428 may uncompress, biasing the dowel 430 into the recess 424. Once the dowel 430 is inside the recess 424, the jaw 48 may not be removed from the actuator arm 46 without compressing the spring 428 with the jaw release tool 414.

FIG. 19 is a perspective view of an embodiment of the chuck 20, illustrating details of the recess 424 within the cavity 412 of the actuator arm 46. As can be seen in FIG. 19, the recess 424 may be contoured to fit the dimensions of the dowel 430. Furthermore, this figure illustrates that when the dowel 430 enters the recess 424, the contact may ensure that the jaw 48 is secured to the actuator arm 46, and may not be removed without compressing the spring 428. In addition, because the recess 424 is contoured to fit the dowel 430, the jaw may not rotate about the axis 419 of the shaft 418. In certain embodiments, the lock pin 410 may engage the recess 424 after axially inserting and rotating the jaw 48 within the cavity 412 until the pin 410 aligns with the recess 424. In other embodiments, the jaw 48 and actuator arm 46 may include one or more alignment features or guides (e.g., a guide pin and slot) to guide the jaw 48 into the cavity 412 in alignment between the pin 410 and the recess 424.

As previously discussed, the embodiment of FIGS. 14-19 may result in a lighter chuck 20. Additional weight savings may be obtained by employing a hybrid chuck body. This type of chuck body may have a core and shell, where the core is made of a composite material and the shell is made of metal. The combination of employing the present embodiment with the hybrid chuck body may produce a weight savings of approximately 38% compared to prior chuck configurations. Lighter chucks may consume less energy to accelerate, resulting in power savings and improved motor longevity. In addition, lighter chucks may facilitate the use of smaller motors to drive the chuck 20. These smaller motors may reduce the cost of the machining apparatus, typically a lathe.

The quick-release mechanism and the unitary non-split upper bearing of the disclosed embodiments can be used together or separately in new chuck assemblies or can be used together or separately to retrofit existing chuck assemblies not having these features. To facilitate this, kits can be sold to upgrade the existing chuck assemblies. In particular, as shown in FIG. 5, a retrofit kit 500 can include the actuator arm 46, the homing mechanism 120, the seal ring assembly 84, the front bearing assembly 80, the quick-release mechanism 160, and the jaw 48. The jaw 48 can be provided as a blank to be machined by the purchaser for the particular workpiece to be held or can be pre-machined in the desired configuration to hold a workpiece. Optionally, the retrofit kit 500 can include the end cap 70 and the spring 72. It should be appreciated that the quick-release mechanism included in the retrofit kit 500 can be any of the quick-release mechanisms described herein. Furthermore, if desired, in lieu of a quick-release mechanism, the retrofit kit 500 can be configured to use a single-threaded fastener 406 to retain a jaw to the associated actuator arm. Thus, the retrofit kit 500 can be used to retrofit an existing chuck assembly to provide the benefits of a unitary non-split upper bearing and/or a quick-release mechanism and/or a single fastener attaching method.

The workholding chuck according to the disclosed embodiments is suitable for use in a high-speed application. For example, the chuck according to the disclosed embodiments can be used on a lathe or other machining apparatus that rotates the chuck assembly at speeds in excess of 3,000 RPM. It should be appreciated, however, that the chuck assembly can be used on lower-speed applications, although all the benefits of the disclosed embodiments may not be realized. Additionally, it should be appreciated that the quick-release mechanisms and the non-split unitary front bearing of the disclosed embodiments can be used together or separately. Additionally, the quick-release mechanisms and/or the non-split unitary front bearing can be used with actuator arms that are driven by other means than the actuator plate 30 disclosed herein. For example, the non-split unitary bearing and/or quick-release mechanism of the disclosed embodiments can be used on an actuator arm disposed in an equalizing chuck, such as that shown in U.S. Pat. No. 6,655,699, entitled "Six Jaw Equalizing Chuck," the disclosure of which is incorporated herein by reference in its entirely. Moreover, while the disclosed embodiments have a chuck with three actuating arms and three jaws, it should be appreciated that more or less than three actuator arms and/or jaws can be used. Thus, while the disclosed embodiments have been described with reference to particular illustrations and figures, it should be appreciated that changes can be made to that shown without deviating from the present disclosure. Thus, the description is merely exemplary in nature and variations are not to be regarded as a departure from the spirit and scope of the disclosed embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a cutting tool;
a drive;
a chuck rotatable by the drive, wherein the chuck comprises:
a plurality of actuator arms;
a plurality of jaws; and
a plurality of spring-loaded lock pins coupling the respective jaws to the respective actuator arms by blocking movement of the respective jaws along respective longitudinal axes of the respective actuator arms, wherein compressing each spring-loaded lock pin enables movement and removal of each respective jaw from each respective actuator arm along the respective longitudinal axes.

2. The system of claim 1, wherein each jaw comprises a passage extending to a recess in each respective actuator arm, and the spring-loaded lock pin in the respective passage is biased toward the recess.

3. The system of claim 2, wherein each actuator arm comprises a tool opening adjacent to each respective recess, and the tool opening is configured to enable insertion of a tool into the passage to bias the spring-loaded lock pin away from the recess.

4. The system of claim 2, wherein the passage has an angle of at least about 7.5 degrees relative to a longitudinal axis of the respective actuator arm and the respective jaw.

5. The system of claim 1, wherein each spring-loaded lock pin is configured to extend across an interface between each respective jaw and actuator arm.

6. The system of claim 1, wherein each jaw fits within a cavity inside a generally annular wall of each respective actuator arm.

7. The system of claim 1, wherein each jaw mates with each respective actuator arm along an interface having a generally conical shape.

8. The system of claim 7, wherein the interface comprises the generally conical shape and a generally cylindrical shape, and an angle of the generally conical shape relative to the generally cylindrical shape is at least about 7.5 degrees.

9. A system, comprising:
a chuck configured to hold a workpiece, the chuck comprising:
a chuck body; and
an actuator arm coupled to the chuck body, wherein the actuator arm comprises an annular wall surrounding a cavity, a recess along an interior surface of the annular wall near a base portion of the cavity, and a tool opening through the annular wall adjacent to the recess, wherein the recess comprises a cylindrical hole at an angle into the interior surface of the annular wall, and the angle is greater than 0 degrees and less than 90 degrees;
wherein the cavity is configured to receive a jaw, the recess is configured to receive a spring-loaded lock pin biased from the jaw toward the annular wall, and the tool opening is configured to receive a tool to bias the spring-loaded lock pin away from the recess.

10. The system of claim 9, wherein the interior surface of the annular wall comprises a generally conical surface and a generally cylindrical surface.

11. The system of claim 10, wherein an angle of the generally conical surface relative to the generally cylindrical surface is at least about 7.5 degrees and less than 90 degrees.

12. The system of claim 9, wherein the angle is at least about 7.5 degrees and less than about 45 degrees.

13. The system of claim 9, wherein the tool opening extends through the annular wall at an angle toward the recess.

14. The system of claim 9, comprising the jaw disposed in the cavity, and the spring-loaded lock pin biased from the jaw toward the recess in the annular wall.

15. A system, comprising:
a workpiece holding jaw comprising a passage, wherein the passage extends at an angle from an end portion to a side portion of the workpiece holding jaw; and
a spring-loaded lock pin disposed in the passage, wherein the spring-loaded lock pin is biased outwardly from the side portion of the workpiece holding jaw, the spring-loaded lock pin is configured to block movement of the jaw relative to an actuator arm via engagement with a recess in the actuator arm, and compressing the spring-loaded lock pin enables movement and removal of the jaw from the actuator arm.

16. The system of claim 15, wherein the spring-loaded lock pin comprises a head coupled to the end portion, a dowel extending movably from the side portion, and a spring disposed between the head and the dowel.

17. The system of claim 15, wherein the angle is at least about 7.5 degrees relative to a longitudinal axis of the workpiece holding jaw.

18. The system of claim 15, wherein the workpiece holding jaw comprises a shaft portion having an exterior mounting surface, and the exterior mounting surface comprises a generally conical shape.

19. The system of claim 18, wherein the exterior mounting surface comprises the generally conical shape and a generally cylindrical shape, and an angle of the generally conical shape relative to the generally cylindrical shape is at least about 7.5 degrees.

* * * * *